(12) United States Patent
Tobaru et al.

(10) Patent No.: US 6,618,655 B2
(45) Date of Patent: Sep. 9, 2003

(54) PROCESS FOR DETERMINING LATERAL OVERTURNING OF VEHICLE AND OCCUPANT PROTECTING SYSTEM IN VEHICLE

(75) Inventors: Shigeo Tobaru, Wako (JP); Hiroyuki Maeda, Wako (JP); Osamu Takahata, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/812,904

(22) Filed: Mar. 15, 2001

(65) Prior Publication Data

US 2001/0038202 A1 Nov. 8, 2001

(30) Foreign Application Priority Data

Mar. 17, 2000 (JP) ........................... 2000-077276
Mar. 22, 2000 (JP) ........................... 2000-080869
Mar. 22, 2000 (JP) ........................... 2000-080892

(51) Int. Cl.⁷ ............................................. B60R 21/32
(52) U.S. Cl. ........................... 701/45; 701/1; 340/429; 340/440; 280/735; 180/282
(58) Field of Search ....................... 701/1, 36, 45; 280/728.1, 805, 735; 340/429, 440; 180/271, 282

(56) References Cited

U.S. PATENT DOCUMENTS

| | | | | |
|---|---|---|---|---|
| 6,002,974 A | * | 12/1999 | Schiffmann | 701/36 |
| 6,002,975 A | * | 12/1999 | Schiffmann et al. | 701/36 |
| 6,038,495 A | * | 3/2000 | Schiffmann | 701/1 |
| 6,104,284 A | * | 8/2000 | Otsuka | 340/440 |
| 6,192,305 B1 | * | 2/2001 | Schiffmann | 701/45 |
| 6,282,474 B1 | * | 8/2001 | Chou et al. | 701/45 |
| 6,433,681 B1 | * | 8/2002 | Foo et al. | 340/440 |
| 6,438,463 B1 | * | 8/2002 | Tobaru et al. | 701/1 |
| 2001/0038202 A1 | * | 11/2001 | Tobaru et al. | 280/805 |
| 2002/0087235 A1 | * | 7/2002 | Aga et al. | 701/1 |
| 2002/0099486 A1 | * | 7/2002 | Nagao et al. | 701/45 |
| 2002/0152012 A1 | * | 10/2002 | Watson et al. | 701/45 |
| 2002/0183899 A1 | * | 12/2002 | Wallner | 701/1 |

FOREIGN PATENT DOCUMENTS

| | | |
|---|---|---|
| DE | 40 23 109 A1 | 1/1992 |
| DE | 198 06 836 C | 9/1999 |
| DE | 197 19 454 A | 7/2001 |
| EP | 0 873 918 A2 | 10/1998 |
| EP | 0 965 502 A2 | 12/1999 |
| JP | 7164985 | 6/1995 |

* cited by examiner

*Primary Examiner*—Gary Chin
(74) *Attorney, Agent, or Firm*—Carrier Blackman & Associates, P.C.; Joseph P. Carrier; William D. Blackman

(57) ABSTRACT

A process for determining lateral overturning of a vehicle involves establishing a threshold value line S separating a lateral overturning region farther from an origin and a lateral non-overturning region closer to the origin on a two-dimensional map made using a rolling angle θ and a rolling angular speed ω of the vehicle. When a hysteresis line for actual rolling angles and actual rolling angular speeds of the vehicle traverses the threshold value line from the lateral non-overturning region to the lateral overturning region, it is determined that there is a possibility of lateral overturning of the vehicle, and correspondingly an occupant protecting system may be deployed. Also, to assure accuracy, a lateral acceleration sensor for detecting a lateral acceleration for establishing the threshold value line S is disposed on a center plane of a vehicle body.

15 Claims, 18 Drawing Sheets

FIG.1
| NAME | IMAGE | CLASSIFICATION |
|---|---|---|
| FLIP OVER | 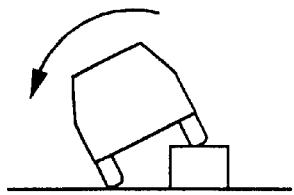 | SIMPLE ROLL |
| CLIMB OVER | 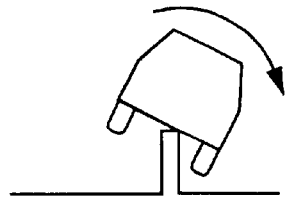 | SIMPLE ROLL |
| FALL OVER | 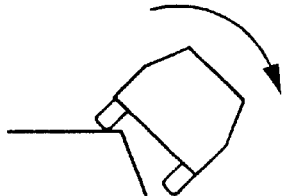 | SIMPLE ROLL |
| TRIP OVER | 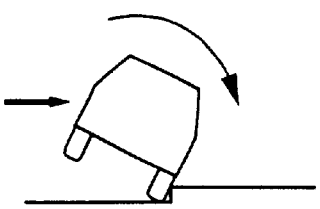 | SIMPLE ROLL + SIDESLIP SPEED |
| TURN OVER | 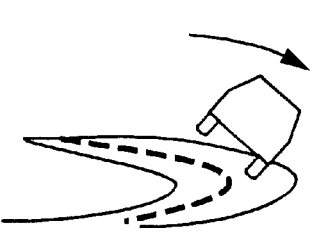 | DIVERGENCE |

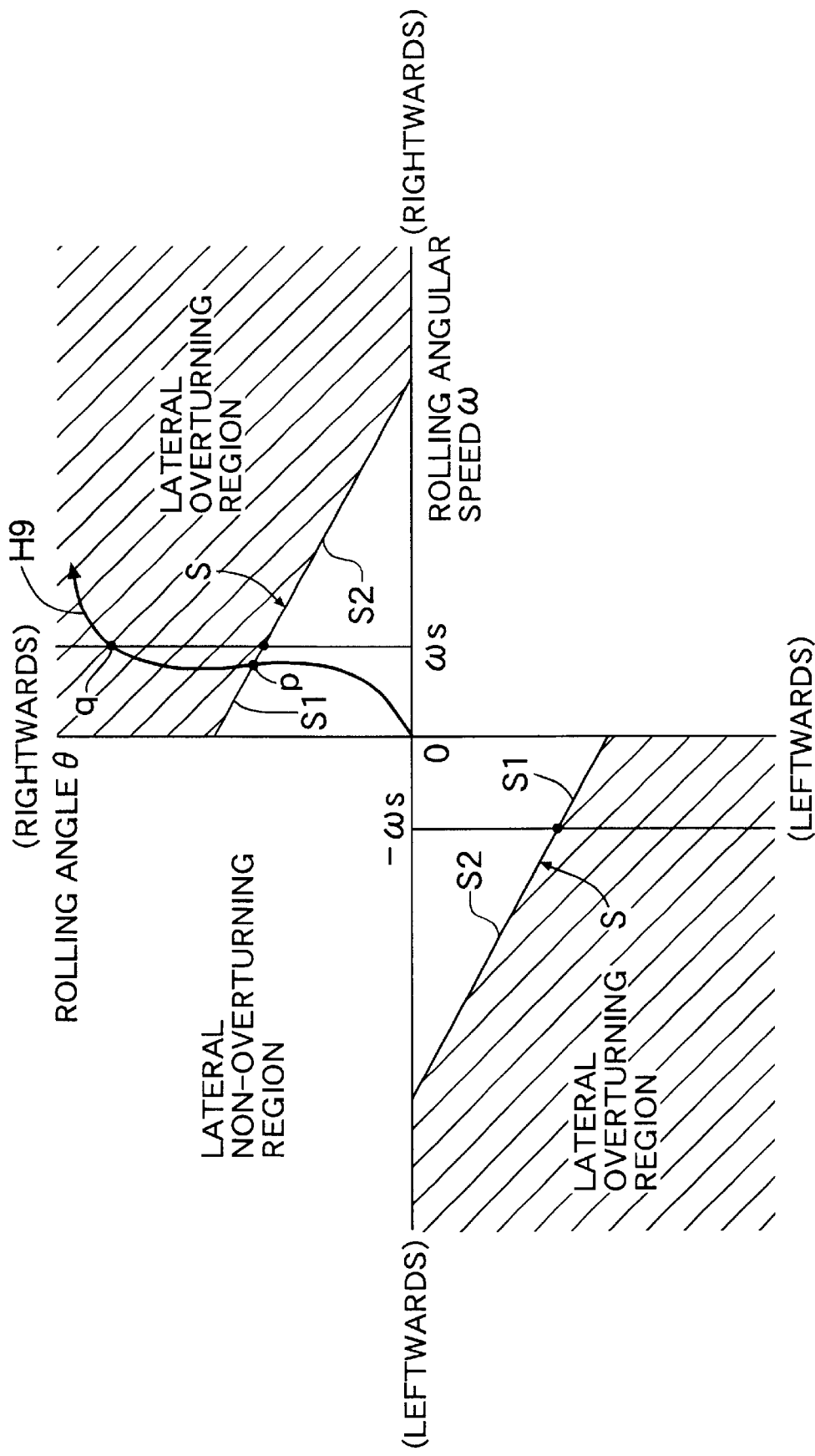

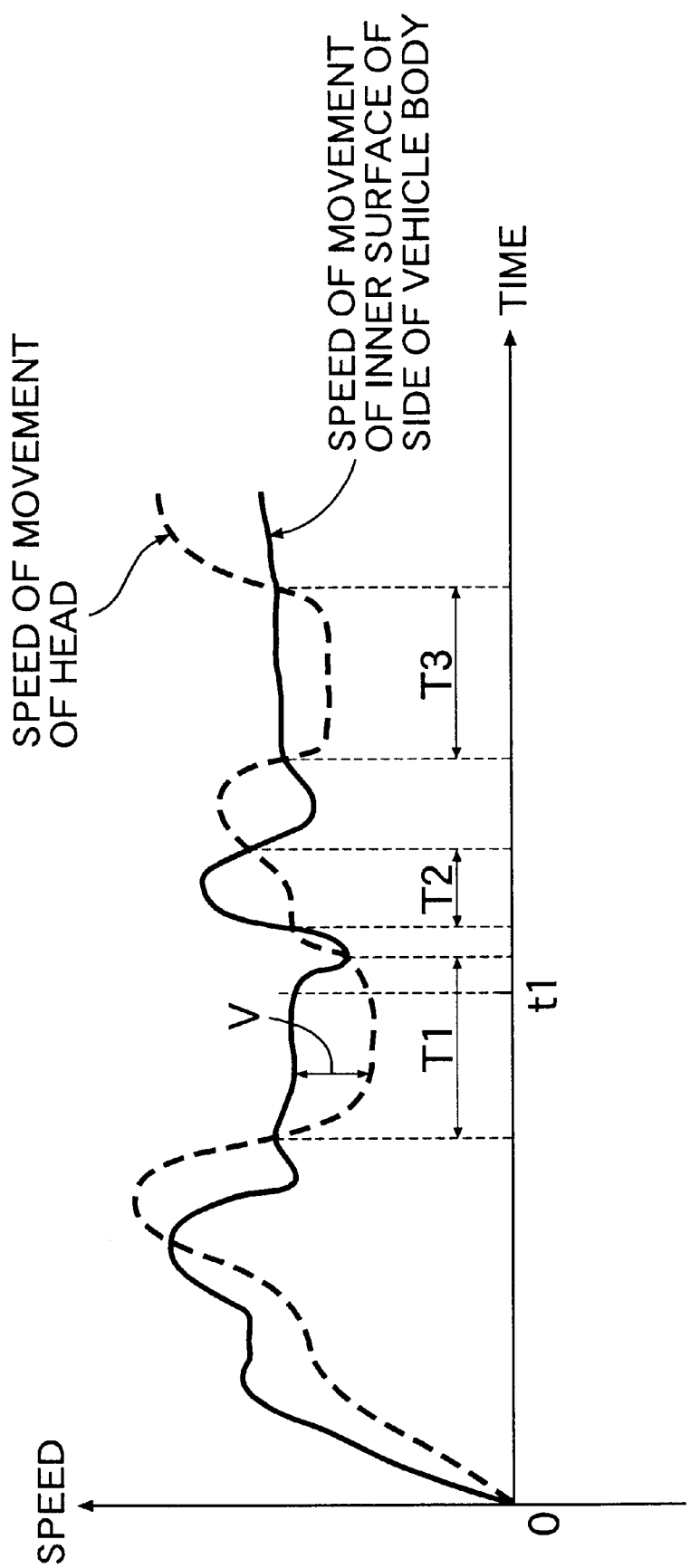

PROCESS FOR DETERMINING LATERAL OVERTURNING OF VEHICLE AND OCCUPANT PROTECTING SYSTEM IN VEHICLE

BACKGROUND OF THE INVENTION

1. Field of the Invention

The present invention relates to a process for determining the presence or absence of a possibility that a vehicle is overturned laterally or sideways, based on a rolling angle and a rolling angular speed of the vehicle. The present invention also relates to an occupant protecting system including an occupant restraint means, in which it is determined whether there is a possibility of lateral overturning of a vehicle, based on a rolling angle and a rolling angular speed of the vehicle, and when it is determined that there is a possibility of lateral overturning, the occupant restraint means is operated.

2. Description of the Related Art

A process for determining whether there is a possibility of lateral overturning of a vehicle is known from Japanese Patent Application Laid-open No.7-164985. According to such process, on a two-dimensional map made using a rolling angle and a rolling angular speed of a vehicle as parameters, a lateral overturning region is established in an area where the rolling angle and the rolling angular speed are large (i.e., an area farther from an origin of the map), and a lateral non-overturning region is established in an area where the rolling angle and the rolling angular speed are small (i.e., an area including the origin), and when a hysteresis line made by plotting actual rolling angles and actual rolling angular speeds detected by sensors on the map enters into the lateral overturning region, it is determined that there is a possibility of lateral overturning of the vehicle, whereby an active roll bar is rised.

In order to calculate an initial value for detecting a rolling angle of the vehicle, or to move a threshold value line which is a boundary between the lateral non-overturning region and the lateral overturning region on the map, a lateral acceleration of the vehicle may be detected by a lateral acceleration sensor in some cases. When the vehicle has no rolling angular speed, an output of a lateral acceleration cannot be influenced by a position in which the lateral acceleration sensor has been mounted. However, when the vehicle has a rolling angular speed about a rolling center, if the lateral acceleration sensor is mounted at a position spaced apart from the rolling center, a radial acceleration about the rolling center is generated at the position corresponding to the lateral acceleration sensor by the rolling angular speed of the vehicle, and a component of such radial acceleration in a lateral direction of a vehicle body is included as an error in an output from the lateral acceleration sensor, resulting in a problem that the lateral acceleration sensor cannot detect an accurate lateral acceleration.

An occupant protecting system is known from Japanese Patent Publication No.7-112801, which includes a seat belt device provided with a seat belt pretensioner, and an air bag device, so that the operations of the seat belt device and the air bag device are selectively controlled based on four threshold value signals output in accordance with the magnitude of a vehicle speed and the lateral overturning of the vehicle.

When the vehicle is laterally overturned slowly at a smaller rolling angular speed, the occupant is moved toward the door window by the force of gravity. On the other hand, when the vehicle is laterally overturned rapidly at a larger rolling angular speed, the occupant is left within a vehicle compartment under the action of inertia, resulting in an increased distance to the door window. When an occupant restraint means which is deployed between the occupant and the door window such as an air curtain is used, the effect of the occupant restraint means is varied depending on whether the occupant is in a position closer to the door window. For this reason, in a vehicle including a plurality of occupant restraint means, it is necessary to properly control the operations of the plurality of occupant restraint means in accordance with a rolling angular speed at the time of lateral overturning of the vehicle to exhibit an optimal occupant restraining performance. When the occupant restraint means is operated with the occupant being closer to the door window, there is a possibility that such occupant restraint means interferes with the occupant when being deployed, whereby a sufficient effect cannot be exhibited.

SUMMARY OF THE INVENTION

Accordingly, it is a first object of the present invention to ensure that when it is determined whether there is a possibility of lateral overturning of a vehicle, based on a rolling angle and a rolling angular speed of the vehicle, a reduction in accuracy of detection of a lateral acceleration due to the rolling of the vehicle is suppressed to the minimum.

It is a second object of the present invention to ensure that when a vehicle including a plurality of occupant restraint means is laterally overturned, the plurality of occupant restraint means exhibit an optimal occupant restraining performance.

It is a third object of the present invention to ensure that the operation of an occupant restraint means which is deployed between an occupant and an inner surface of a side of a vehicle body is properly controlled in accordance with the behavior of the occupant within a vehicle compartment during lateral overturning of the vehicle.

To achieve the above first object, according to a first aspect and feature of the present invention, there is provided a process for determining lateral overturning of a vehicle, comprising the step of establishing a threshold value line separating a lateral overturning region farther from an origin and a lateral non-overturning region closer to the origin on a two-dimensional map made using a rolling angle and a rolling angular speed of the vehicle, so that when a hysteresis line for actual rolling angles and actual rolling angular speeds of the vehicle traverses the threshold value line from the lateral non-overturning region to the lateral overturning region, it is determined that there is a possibility of lateral overturning of the vehicle, and wherein a lateral acceleration sensor for detecting a lateral acceleration for establishing the threshold value line is disposed on a center plane of a body of the vehicle.

With the above feature, the lateral acceleration sensor for detecting the lateral acceleration is disposed on the center plane of the vehicle body and hence, even if a radial acceleration about a rolling center on the center plane of the vehicle body is generated due to the rolling of the vehicle about the rolling center, an output from the lateral acceleration sensor cannot be influenced because such radial acceleration lies on the center plane of the vehicle body. In addition, even if an acceleration is generated on a line connecting a point of contact of one of left and right wheels on the ground and the lateral acceleration sensor to each other due to the rolling of the vehicle body about the point of contact of the wheel on the ground, an error provided to the output from the lateral acceleration sensor by the radial acceleration generated due to the rolling is equalized in a case where the point of contact of the right wheel is a rolling center and in a case where the point of contact of the left wheel is a rolling center, whereby the influence to the accuracy of detection of the lateral acceleration sensor is suppressed to the minimum.

To achieve the above second object, according to a second aspect and feature of the present invention, there is provided an occupant protecting system comprising a plurality of occupant restraint means, in which a threshold value line separating a lateral overturning region farther from an origin and a lateral non-overturning region closer to the origin is established on a two-dimensional map made using a rolling angle and a rolling angular speed of a vehicle as parameters, and when a hysteresis line for actual rolling angles and actual rolling angular speeds of the vehicle traverses the threshold line from the lateral non-overturning region to the lateral overturning region, it is determined that there is a possibility of lateral overturning of the vehicle, whereby the plurality of occupant restraint means are operated, and wherein the plurality of occupant restraint means are operated selectively based on a rolling angular speed at a time when it is determined that there is the possibility of lateral overturning of the vehicle.

With the above feature, the operation and non-operation of the plurality of occupant restraint means can be switched over between a condition when the vehicle is laterally overturned slowly at a smaller rolling angular speed, causing the occupant to be moved toward a door window, and a condition when the vehicle is laterally overturned rapidly at a larger rolling angular speed, causing the occupant to be moved away from the door window, thereby exhibiting an optimal occupant restraining performance.

To achieve the second object, according to a third aspect and feature of the present invention, in addition to the second feature, the plurality of occupant restraint means are a seat belt pretensioner and an air curtain, and in a condition where the rolling angular speed is smaller, only the seat belt pretensioner is operated, and in a condition where the rolling angular speed is larger, both the seat belt pretensioner and the air curtain are operated.

With the above arrangement, when the vehicle is laterally overturned slowly due to a smaller rolling angular speed, causing the occupant to be moved toward the door window, the air curtain which is deployed along the door window is not operated and hence, it is possible to prevent the air curtain from interfering with the occupant. Moreover, the occupant can be sufficiently restrained by the seat belt pretensioner, because the vehicle is laterally overturned slowly. When the vehicle is laterally overturned rapidly due to a larger rolling angular speed, causing the occupant to be moved away from the door window, the air curtain can be operated without interfering with the occupant, and the seat belt pretensioner can also be operated, whereby the occupant can be restrained by both the air curtain and the seat belt pretensioner.

To achieve the third object, according to a fourth aspect and feature of the present invention, there is provided an occupant protecting system comprising a occupant restraint means, in which a threshold value line separating a lateral overturning region farther from an origin and a lateral non-overturning region closer to the origin is established on a two-dimensional map made using a rolling angle and a rolling angular speed of a vehicle as parameters, and when a hysteresis line for actual rolling angles and actual rolling angular speeds of the vehicle traverses the threshold line from the lateral non-overturning region to the lateral overturning region, it is determined that there is a possibility of lateral overturning of the vehicle, whereby the occupant restraint means is operated, and wherein timing of deployment of the occupant restraint means is controlled in accordance with a condition of the occupant within a vehicle compartment in a lateral direction of a vehicle body, attendant on the lateral overturning of the vehicle.

With the above arrangement, the timing of deployment of the occupant restraint means is controlled in accordance with whether the occupant is moved toward an inner surface of a side of the vehicle body or toward a central portion of the vehicle body. Therefore, it is possible to avoid such a situation that the occupant restraint means interferes with the occupant during deployment thereof between the occupant and the inner surface of the side of the vehicle body and as a result, a sufficient effect cannot be exhibited.

To achieve the third object, according to a fifth aspect and feature of the present invention, in addition to the fourth feature, the condition of the occupant is a distance between the occupant and the inner surface of the side of the vehicle body.

With the above arrangement, the timing of deployment of the occupant restraint means is controlled in accordance with the distance between the occupant and the inner surface of the side of the vehicle body and hence, it is possible to reliably prevent the occupant restraint means from interfering with the occupant during deployment thereof.

To achieve the third object, according to a sixth aspect and feature of the present invention, in addition to the fourth feature, the condition of the occupant is a relative speed between the occupant and the inner surface of the side of the vehicle body.

With the above arrangement, the timing of deployment of the occupant restraint means is controlled in accordance with the relative speed between the occupant and the inner surface of the side of the vehicle body and hence, it is possible to reliably prevent the occupant restraint means from interfering with the occupant during deployment thereof. The above and other objects, features and advantages of the invention will become apparent from the following description of the preferred embodiments taken in conjunction with the accompanying drawings.

BRIEF DESCRIPTION OF THE DRAWINGS

FIGS. 1 to 9B show a first embodiment of the present invention, wherein

FIG. 1 is a diagram showing types of lateral overturning of a vehicle;

FIG. 2 is a diagram for explaining the relationship between the rolling angle $\theta$ and the rolling angular speed $\omega$ of the vehicle, as well as a possibility of lateral overturning of the vehicle;

FIG. 3 is a map for determining whether there is a possibility that the vehicle is overturned laterally or sideways;

FIG. 4 is a block diagram of a control system for an air curtain;

FIG. 5 is a diagram for explaining a technique for calculating an initial value $\theta i$ of a rolling angle $\theta$ from a lateral acceleration Gy;

FIG. 6 is a diagram showing a technique for determining whether a hysteresis line is in a lateral overturning region or in a lateral non-overturning region on a map;

FIG. 7 is a flow chart for explaining the operation of the process for determining lateral overturning of the vehicle;

FIG. 8 is a diagram for explaining the operation when the vehicle is rolled about a rolling center of the vehicle;

FIGS. 9A and 9B are diagrams for explaining the operation when the vehicle is rolled about one of left and right wheels;

FIGS. 10 to 13B show a second embodiment of the present invention, wherein

FIG. 10 is a block diagram of a control system for a seat belt pretensioner and an air curtain;

FIG. 11 is a flow chart for explaining the operation of the control system;

FIG. 12 is a map in which an air curtain operating region and an air curtain non-operating region are shown;

FIGS. 13A and 13B are diagrams showing the relationship between the rolling angular speed ω of the vehicle and the behavior of an occupant;

FIGS. 14 to 17B show a third embodiment of the present invention, wherein

FIG. 14 is a block diagram of a control system for an air curtain;

FIG. 15 is a flow chart for explaining the operation of the control system;

FIG. 16 is a diagram showing a locus of movement of the head of an occupant in a course of falling of the vehicle into a condition of lateral overturning;

FIGS. 17A and 17B are diagrams showing the relationship between the rolling angular speed ω of the vehicle and the behavior of an occupant; and FIG. 18 is a diagram showing speeds of movement of an occupant and an inner surface of a side of a vehicle body in a course of falling of the vehicle into a condition of lateral overturning according to a fourth embodiments of the present invention.

DETAILED DESCRIPTION OF THE PREFERRED EMBODIMENTS

A first embodiment of the present invention will now be described with reference to FIGS. 1 to 9B.

FIG. 1 shows types of lateral overturning of a vehicle, which are classified by causes. The types of lateral overturning of the vehicle are classified into "simple roll", "simple roll+lateral slipping speed" and "divergence" depending on the behavior of the vehicle in the course of leading to the lateral overturning. The lateral overturning of the "simple roll" type is further sub-classified into "flip-over", "climb-over" and "fall-over". The lateral overturning of the "simple roll+lateral slipping speed" type is typically called "trip-over, and the lateral overturning of the "divergence" is typically called "turn-over".

The "flip-over" is a lateral overturning" resulting from climbing of one of left and right wheels of the vehicle onto an obstacle. The "climb-over" is a lateral overturning resulting from the vehicle with its bottom climbing on an obstacle being overturned laterally or sideways with its tire floated up from a road surface. The "fall-over" is a lateral overturning resulting from one of left and right wheels of the vehicle being stepped over the edge of a road and dropped therefrom. The "trip-over" is a lateral overturning caused by a rolling moment produced about a curb or the like when one of left and right tires collides against the curb or the like as a result of lateral slipping of the vehicle. The "turn-over" is a lateral overturning resulting from the diverging of the rolling angle of the vehicle due to a resonance, when a driver makes an attempt to operate a steering wheel alternately leftwards and rightwards in order to make a double-lane change or a triple-lane change or to pass an S-shaped road, if a frequency of such operation of the steering wheel is close to a frequency of natural vibration of a suspension of the vehicle.

Figure 2:
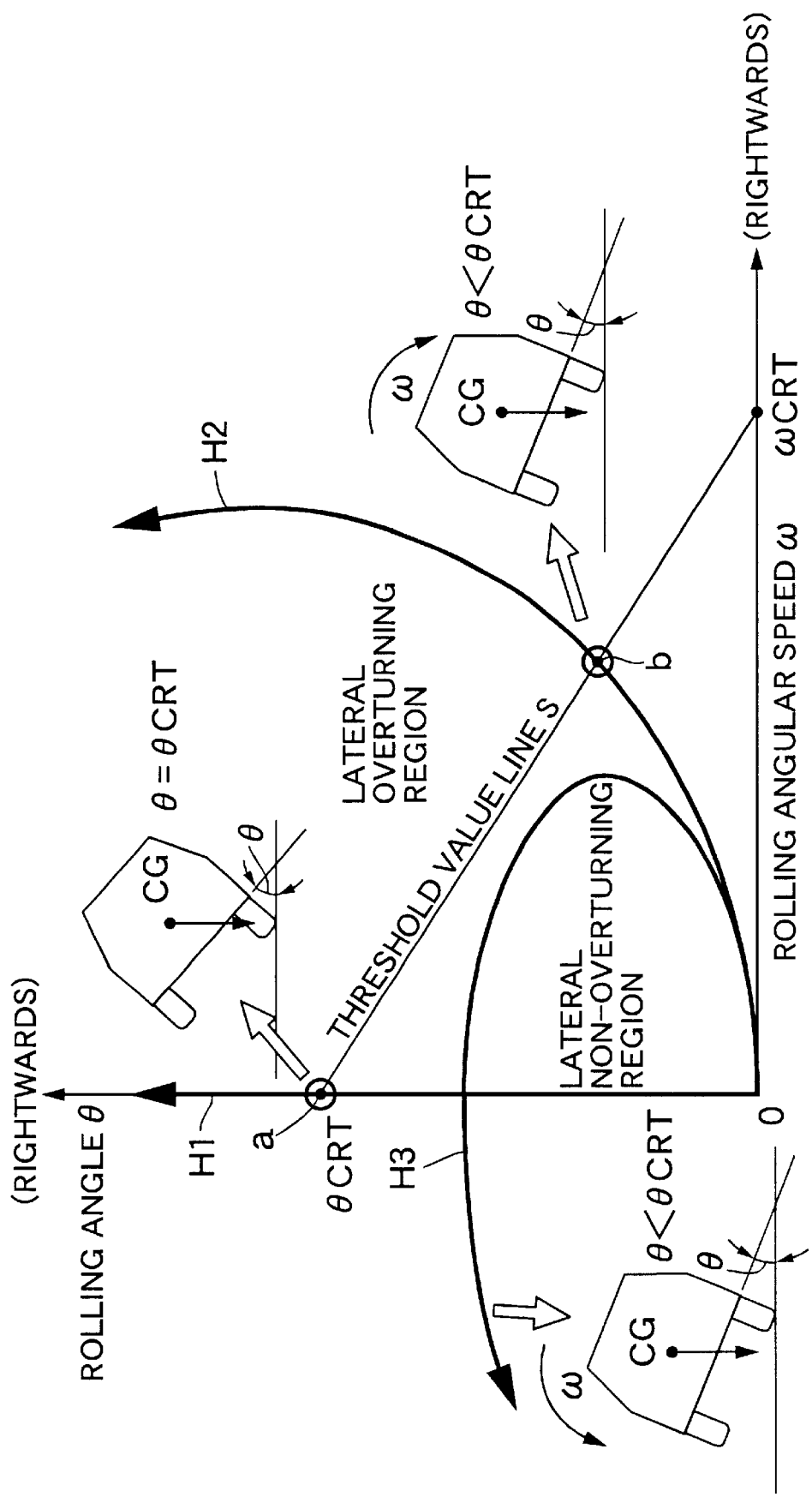

FIG. 2 shows a portion (a first quadrant) of a two-dimensional map for determining a possibility of lateral overturning of the vehicle, wherein the positive value (above the origin) of the rolling angle θ on the axis of ordinates corresponds to the rightward rolling angle, and the positive value (on the right side of the origin) of the rolling angular speed ω on axis of abscissas corresponds to the rightward rolling angular speed. A threshold value line S comprising a rightward declined straight line is established in the two-dimensional map. In this map, a region on the side of the threshold value line S nearer to the origin, namely, a region where the rolling angle θ and the rolling angular speed ω are smaller, is a lateral non-overturning region, and a region on the side of the threshold value line S farther from the origin, namely, a region where the rolling angle and the rolling angular speed ω are larger, is a lateral overturning region. If hysteresis lines H1, H2 and H3 for the actual rolling angle θ and the actual rolling angular speed ω of the vehicle traverse the threshold value line S from the lateral non-overturning region on the side nearer to the origin to the lateral overturning region on the side farther from the origin, it is determined that there is a possibility of lateral overturning of the vehicle.

The hysteresis line H1 corresponds to a case where only the rolling angle θ has been slowly increased with the rolling angular speed ω remaining maintained substantially at 0 (zero) from a state in which both of the rolling angle θ and the rolling angular speed ω have been 0 (i.e., from the origin). When the rolling angle θ has reached a critical rolling angle θCRT at a point a which is an intercept at which the threshold value line S intersects the axis of ordinates, it is determined that there is a possibility of lateral overturning of the vehicle. At this time, the position CG of the gravity of center of the vehicle is on a vertical line extending through a tire which is an outer tire in a rolling direction and which is a fulcrum of rolling. This state is a limitation of static stability regarding the lateral overturning of the vehicle. The value of the critical rolling angle θCRT is varied depending on the shape and the loaded state of the vehicle, but is generally on the order of 50°.

Even if the rolling angle θ is 0, if a large rolling angular speed ω is applied, there is a possibility that the vehicle is overturned laterally. The rolling angular speed ω at this time is defined as a critical rolling angular speed ωCRT.

When the vehicle has a rolling angular speed ω in the same direction as the direction of the rolling angle θ, the lateral overturning is promoted by this rolling angular speed ω. Therefore, even if the vehicle is in a state in which the rolling angle θ is smaller than the critical rolling angle θCRT, the lateral overturning may occur. For example, when the hysteresis line for the rolling angle θ and the rolling angular speed ω is represented by H2, it is determined that there is a possibility of lateral overturning of the vehicle at a point b traversing the threshold value line S from the side nearer to the origin to the side farther from the origin. The rolling angle θ at this time is a value smaller than the critical rolling angle θCRT.

When the hysteresis line for the rolling angle θ and the rolling angular speed ω is represented by H3, the rolling angular speed ω assuming a positive value is changed quickly from the increase to the decrease and is further decreased to a negative value and hence, the hysteresis line H3 cannot traverse the threshold value line S. Therefore, it is determined that there is not a possibility of lateral overturning of the vehicle.

Figure 3:
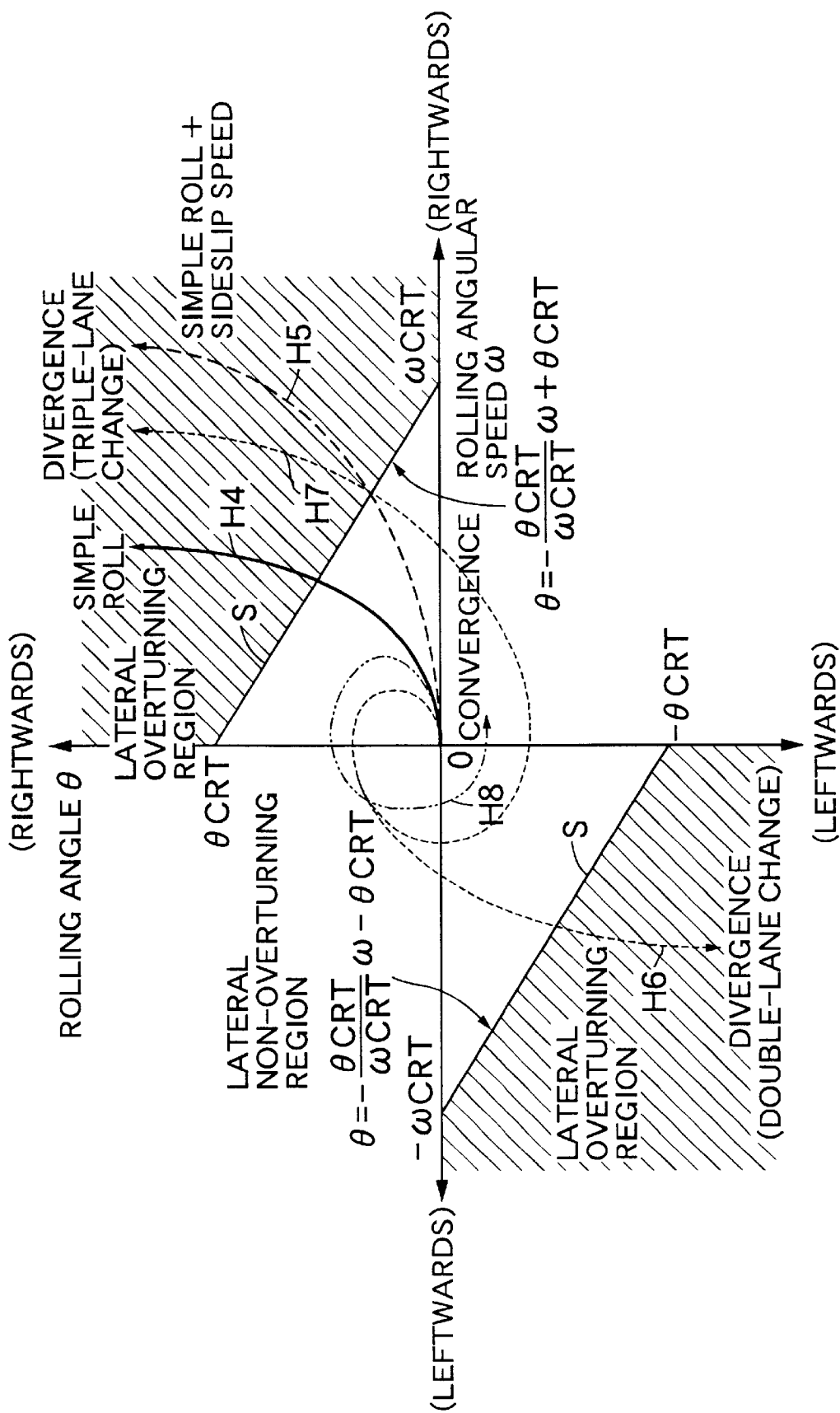

FIG. 3 shows the entire two-dimensional map for determining the possibility of lateral overturning of the vehicle. Two threshold value lines S, S are established in the first quadrant and a third quadrant, respectively, and are point-symmetric about the origin in an initially set state. The reason why a lateral overturning region is not established in each of a second quadrant where the rolling angle θ is positive and the rolling angular speed ω is negative, and in a fourth quadrant where the rolling angle θ is negative and the rolling angular speed ω is positive, is that the lateral overturning of the vehicle does not occur in a state in which a rolling angular speed ω in a direction opposite to the direction of the rolling angle θ has been generated.

Hysteresis lines H4, H5, H6, H7, and H8 for the rolling angle θ and the rolling angular speed ω corresponding to the various types of the lateral overturning described with reference to FIG. 1 are shown in FIG. 3.

The hysteresis line H4 corresponds to the lateral overturning of the "simple roll" type such as "flip-over", "climb-over", "fall-over" and the like, wherein the absolute value of the rolling angle and the absolute value of the rolling angular speed ω are simply increased, resulting in the lateral overturning of the vehicle.

The hysteresis line H5 corresponds to the lateral overturning of the "simple roll+lateral slipping speed" called "trip-over", wherein the rolling angular speed ω is increased sharply, resulting in the lateral overturning, due to the rolling moment generated by the collision of a tire against a curb or the like in the course of lateral slipping of the vehicle.

The hysteresis lines H6 and H7 correspond to the lateral overturning of the "divergence" type called "turn-over". The hysteresis lines H6 indicates the lateral overturning upon the double-lane change. In this case, in the course of the vehicle being rolled rightwards upon the first lane change, and being rolled leftwards upon the next lane change, the absolute value of the rolling angle θ is diverged past the threshold value line S in the third quadrant, resulting in the lateral overturning. The hysteresis line H7 indicates the lateral overturning upon the triple-lane change. In this case, in the course of the vehicle being rolled rightwards upon the first lane change, being rolled leftwards upon the next lane change, and being rolled again rightwards upon the subsequent lane change, the absolute value of the rolling angle θ is diverged past the threshold value line S in the first quadrant, resulting in the lateral overturning.

In the hysteresis line H8, the rolling angle θ is converged toward the origin before passing the threshold value line S, and in this case, the vehicle cannot be overturned laterally or sideways.

Figure 4:
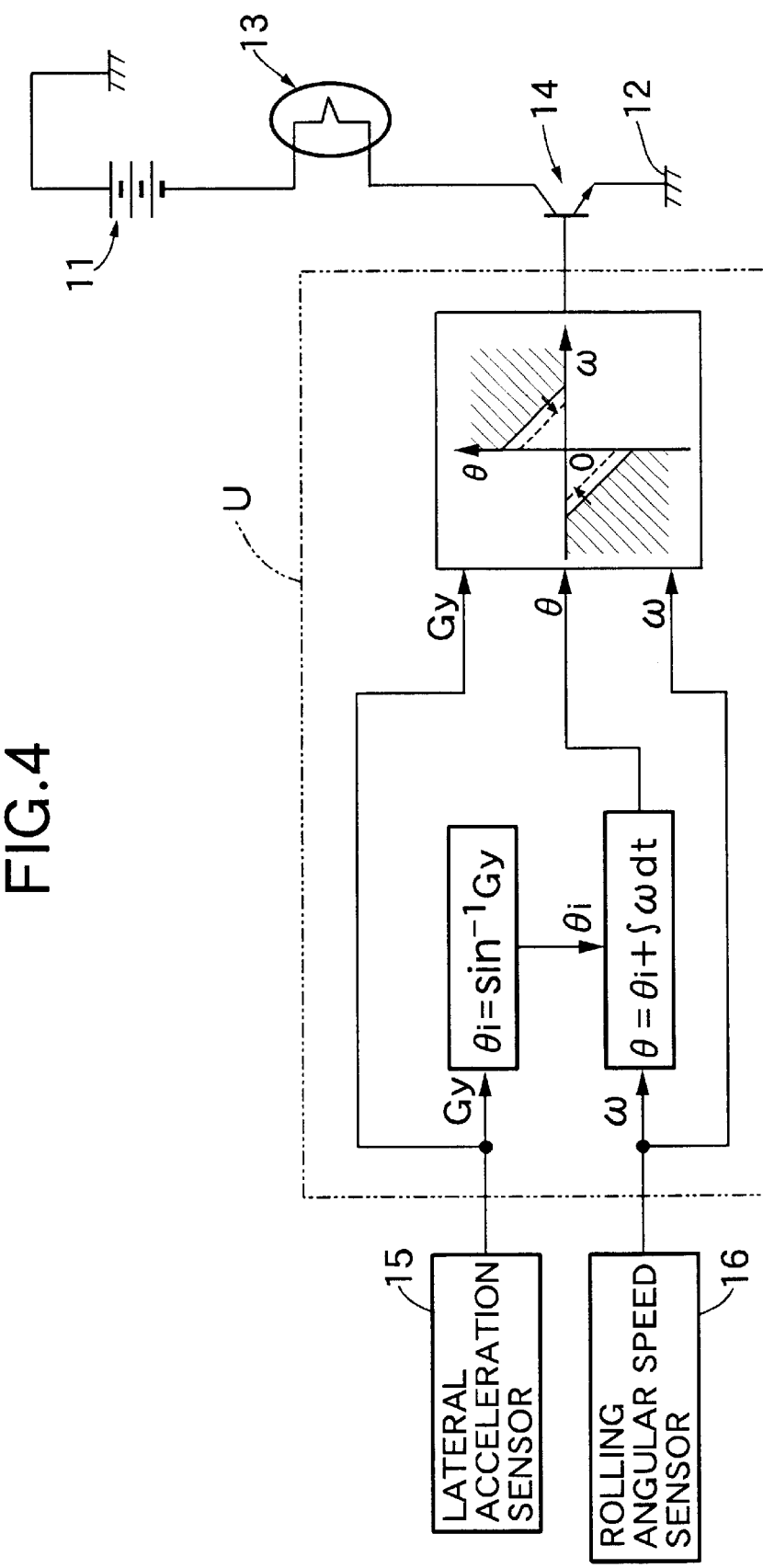

FIG. 4 shows one example of a control system for deploying an air curtain for restraining the head of an occupant along an inner surface of a vehicle compartment upon the lateral overturning of the vehicle.

An inflator 13 for generating a high-pressure gas for deploying the air curtain and an ignition transistor 14 are connected in series between a battery 11 and a ground site 12. When the ignition transistor 14 is turned on by a command from an electronic control unit U, the inflator 13 is ignited to generate the high-pressure gas, and the air curtain supplied with the high-pressure gas is deployed along the inner surface of the vehicle compartment. For determining whether there is a possibility of lateral overturning of the vehicle, a signal from a lateral acceleration sensor 15 for detecting a lateral acceleration Gy which is an acceleration in a lateral direction of the vehicle body and a signal from a rolling angular speed sensor 16 for detecting a rolling angular speed ω of the vehicle are input to the electronic control unit U.

Figure 5:
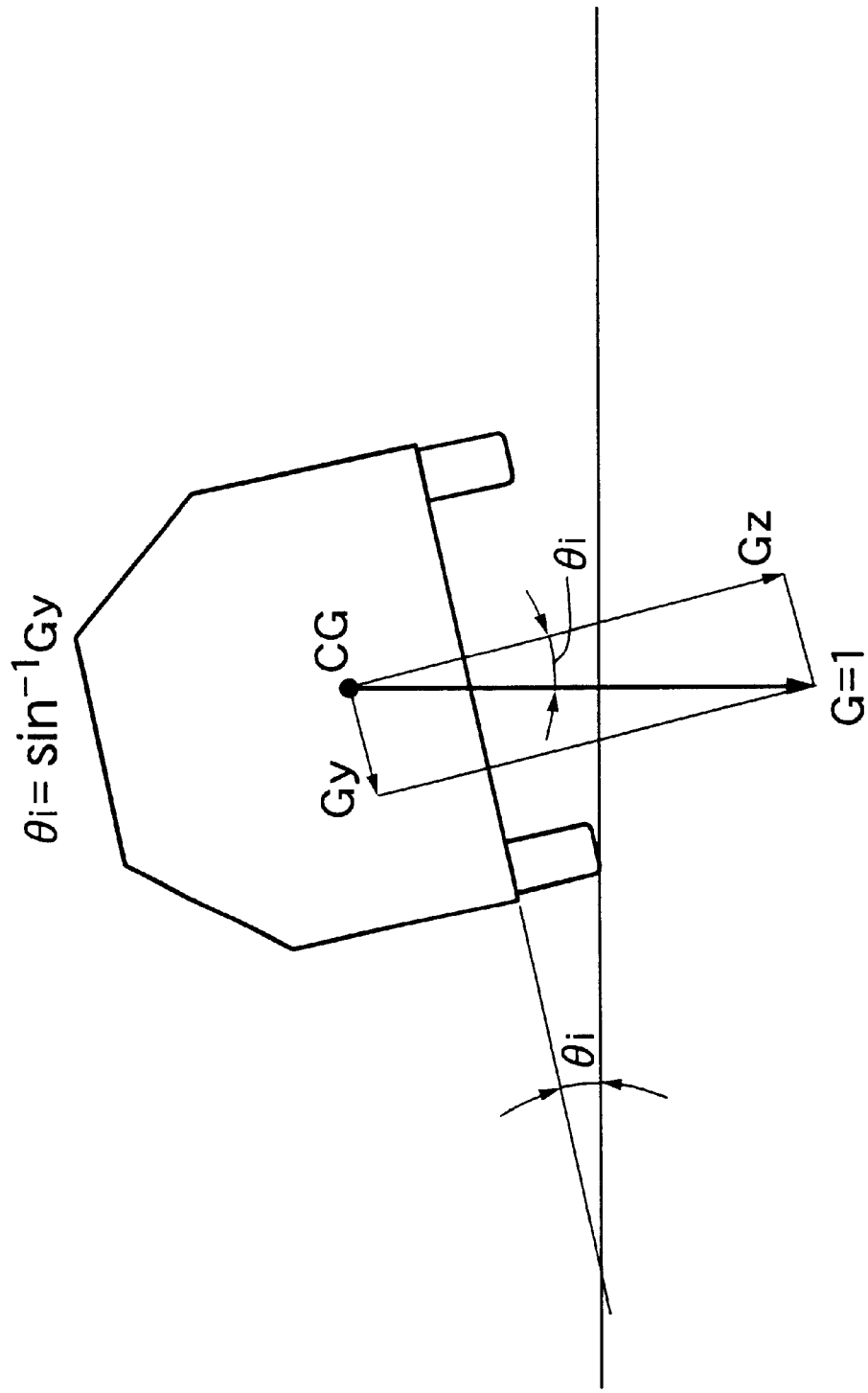

As shown in FIGS. 4 and 5, the lateral acceleration sensor 15 fixed to the vehicle body outputs a lateral acceleration Gy at a time point of turning-on of an ignition switch. When the ignition switch has been turned on, the vehicle is in its stopped state and hence, a lateral acceleration due to a centrifugal force produced with the turning movement of the vehicle cannot be detected, and only a component of a gravitational acceleration G (=1) in the lateral direction of the vehicle body is detected as a lateral acceleration Gy. Therefore, an initial value θi of rolling angle θ of the vehicle can be calculated using the lateral acceleration Gy according to an equation, $\theta i = \sin^{-1} Gy$.

When the initial value θi of the rolling angle θ of the vehicle has been calculated based on an output from the lateral acceleration sensor 15 at the time point of turning-on of the ignition switch in the above manner, a current rolling angle θ of the vehicle is calculated by adding a value of variation in rolling angle θ to the initial value θi. More specifically, the rolling angle θ of the vehicle is calculated by adding an integration value $\int \omega dt$ of a rolling angular seed ω output by the rolling angular speed sensor 16 from the time point turning-on of the ignition switch as a value of variation in rolling angle θ to the initial value θi.

The lateral acceleration sensor 15 has a demerit associated therewith in that it cannot detect a lateral acceleration Gy during free dropping of the vehicle, and cannot recognize a lateral acceleration due to the centrifugal force generated with the turning movement of the vehicle as a lateral acceleration Gy which is a component in the lateral direction of the vehicle body, thereby mis-detecting it. However, the rolling angle θ can be correctly calculated, with such demerit eliminated, by using the lateral acceleration Gy output by the lateral acceleration sensor 15 only for the calculation of the initial value θi of the rolling angle θ of the vehicle at the time point of turning-on of the ignition switch, and using the integration value $\int \omega dt$ of the rolling angular speed ω output by the rolling angular speed sensor 16 for the calculation of a subsequent rolling angle θ of the vehicle.

Figure 6:
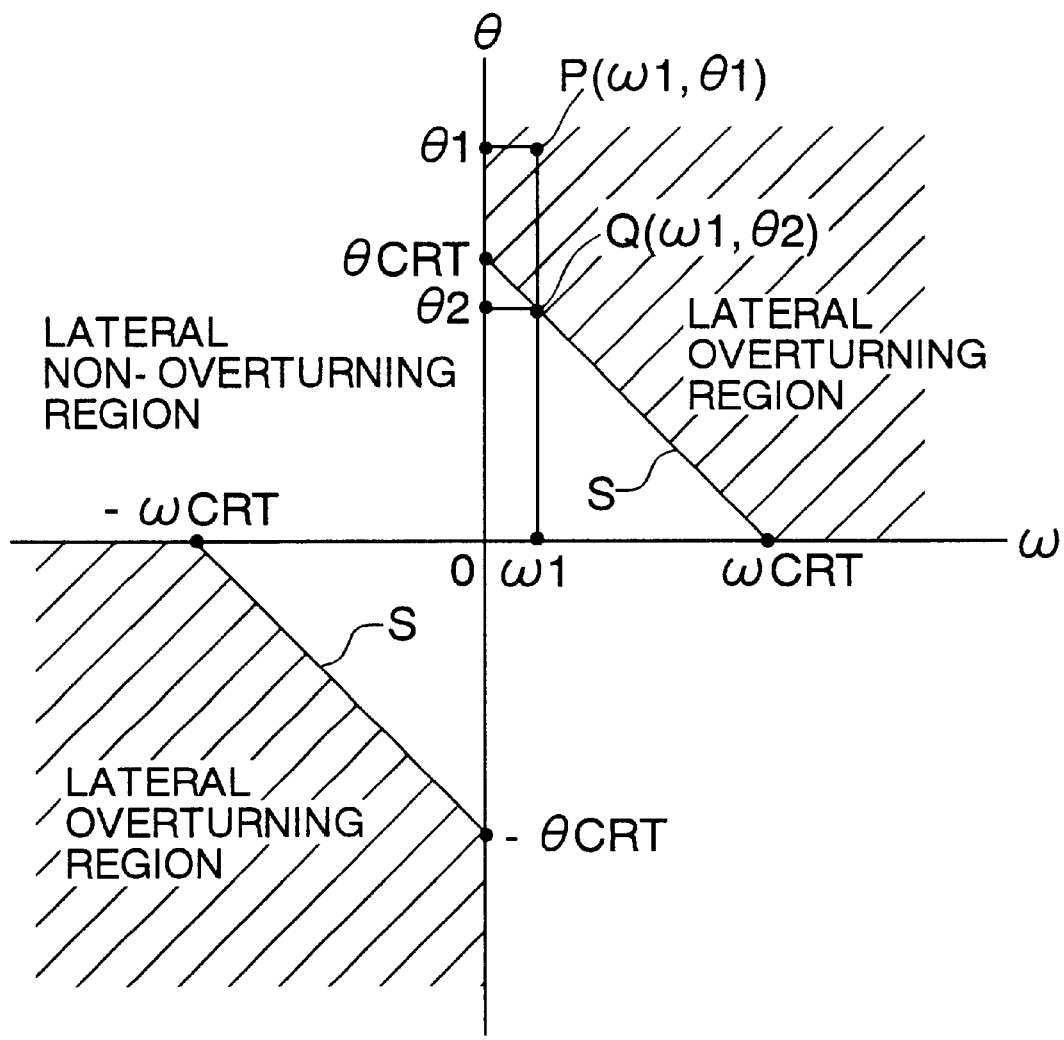

A hysteresis line which is a locus of coordinate points formed by the rolling angle θ of the vehicle calculated in the above manner and the rolling angular speed ω output by the rolling angular speed sensor 16 is described on a map shown in FIG. 6. When the hysteresis line has traversed the threshold value lines S, S from the side nearer to the origin to the side farther from the origin, it is determined that there is a possibility that the vehicle is overturned laterally or sideways, and the ignition transistor 14 is turned on to ignite the inflator 13 for the air curtain.

Figure 7:
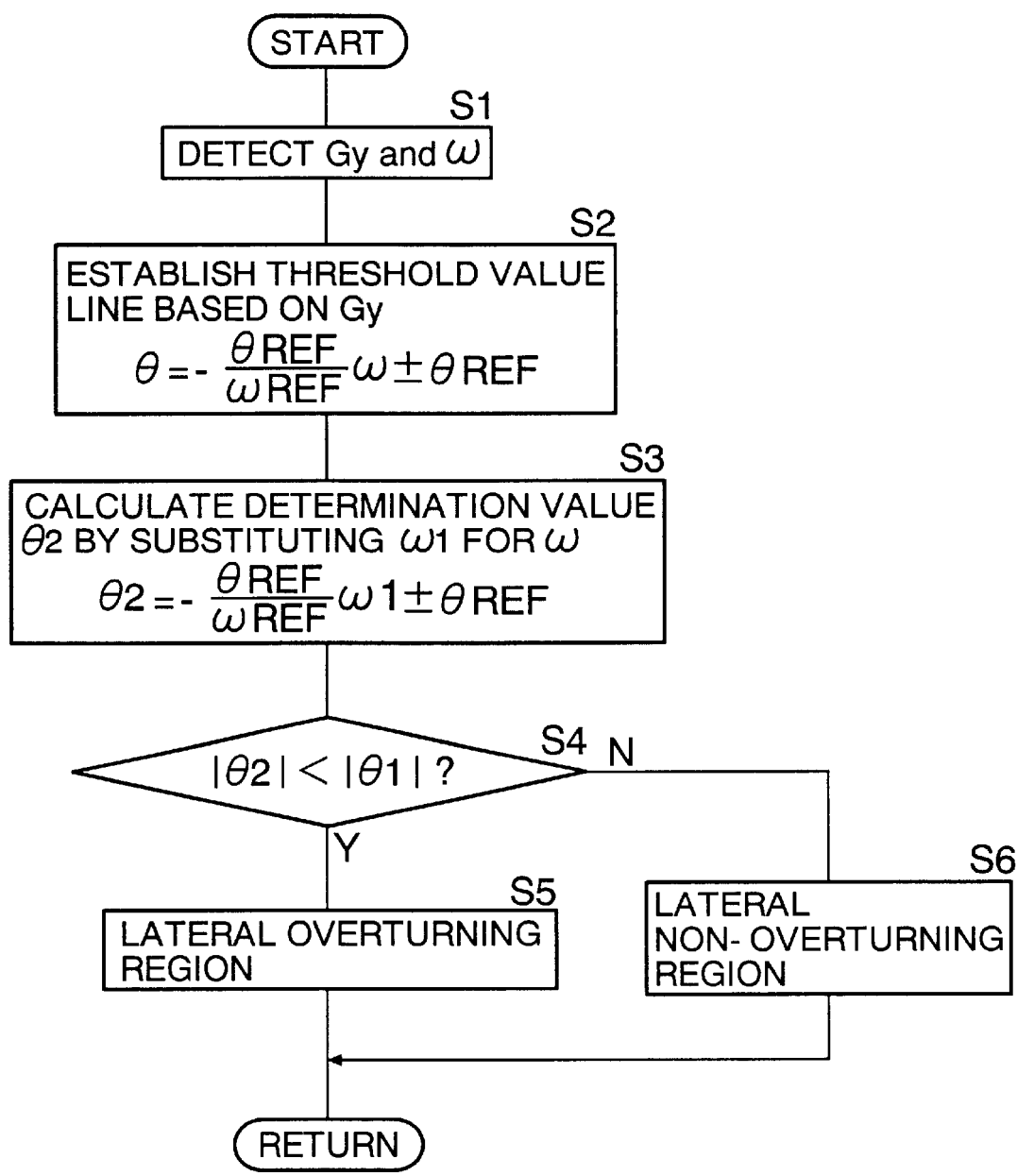

The above-described operation will be further described with reference to FIGS. 6 and 7.

First, a lateral acceleration Gy and a rolling angular speed ω are read at Step S1, and threshold value lines S, S on the map are determined in accordance with the lateral acceleration Gy at Step S2. The threshold value lines S, S are determined, if a critical rolling angle θCRT (which is an intercept on the axis of ordinates of the map) and a critical rolling angular speed ωCRT (which is an intercept on the axis of abscissas) are determined. In the present embodiment, when the lateral overturning of the vehicle is promoted due to the lateral acceleration Gy, both of the critical rolling angle θCRT and the critical rolling angular speed ωCRT are decreased, whereby the threshold value lines S, S are moved in the direction toward the origin. When the lateral overturning of the vehicle is suppressed by the lateral acceleration Gy, both of the critical rolling angle θCRT and the critical rolling angular speed ωCRT are increased, whereby the threshold value lines S, S are moved in the direction away from the origin. Thus, it is possible to determine a suitable lateral overturning region and a suitable lateral non-overturning region according to the lateral acceleration Gy of the vehicle.

When the threshold value line S in the first quadrant is moved in the direction away from the origin, the threshold value line S in the third quadrant is moved in the direction toward the origin, and when the threshold value line S in the first quadrant is moved in the direction toward the origin, the threshold value line S in the third quadrant is moved in the direction away from the origin.

If the critical rolling angle θCRT and the critical rolling angular speed ωCRT are determined, an equation for the threshold value lines S, S is given (see FIG. 3) as follows:

$$\theta = -(\theta CRT/\omega CRT)\omega \pm \theta CRT$$

Subsequently, it is determined whether a coordinate point P provided by a current rolling angle θ1 and a current rolling angular speed ω1 is in the lateral overturning region or the lateral non-overturning region. More specifically, at Step S3, a current value of rolling angular speed ω1 is substituted for ω in the equation for the threshold value line S to calculate a determination value η2. The determining value θ2 is a θ coordinate point which is a point Q of intersection between a straight line ω=ω₁ and the threshold value line S. At subsequent Step S4, the determination value θ2 is compared with the current rolling angle η1. If a relation, |θ2|<|θ1| is established, it is determined at Step S5 that the coordinate point P provided by the current rolling angle θ1 and the current rolling angular speed ω1 is in the lateral overturning region. If the relation, |θ2|<|θ1| is not established, it is determined at Step S5 that the coordinate point P provided by the current rolling angle θ1 and the current rolling angular speed ω1 is in the lateral non-overturning region. A case (|θ2|<|θ1|) where the coordinate point P is in the lateral overturning region is shown in FIG. 6.

Figure 8:
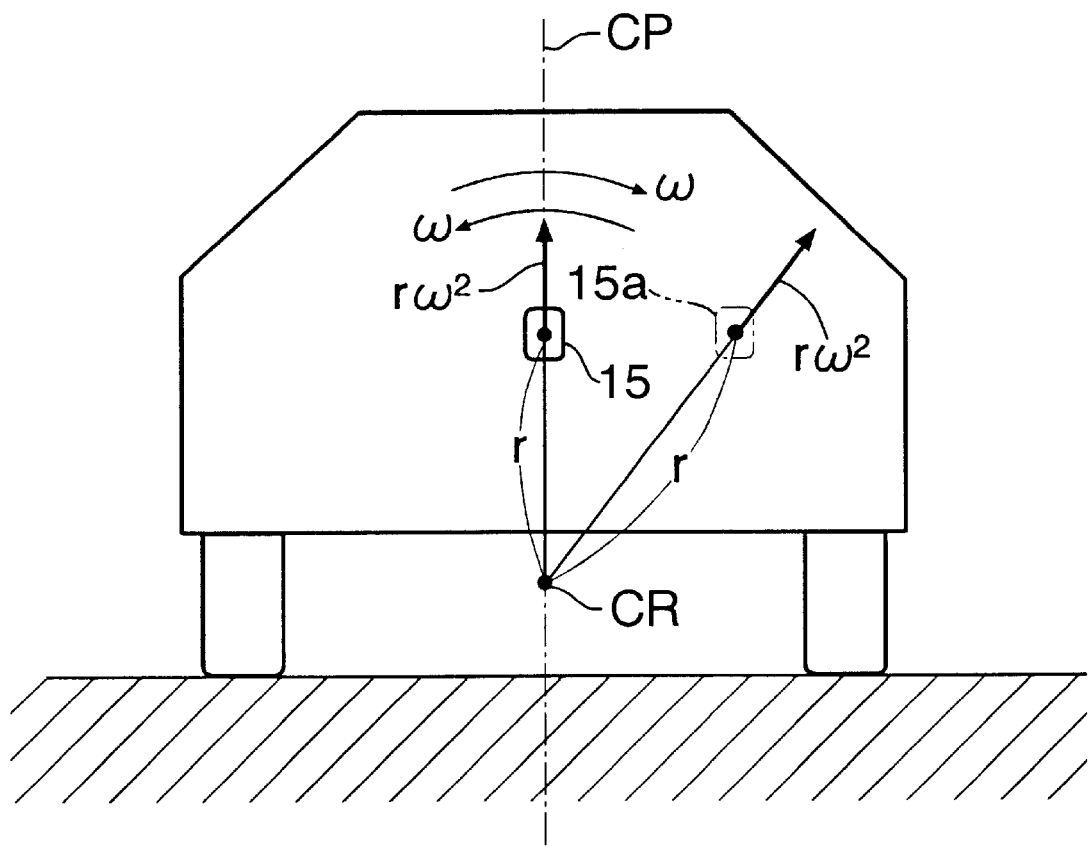

As shown in FIG. 8, the lateral acceleration sensor 15 is mounted on a center plane CP of the vehicle body. If the lateral acceleration sensor 15 is placed in a position at a rolling center CR on the center plane CP of the vehicle body, even if the vehicle is rolled about the rolling center CR, no acceleration is produced in the position corresponding to the lateral acceleration 15 due to such rolling, and the lateral acceleration Gy output by the lateral acceleration 15 cannot be influenced. When the lateral acceleration 15 is mounted on the center plane CP of the vehicle as in the embodiment, an acceleration represented by rxω² (wherein r is a distance between the lateral acceleration sensor 15 and the rolling center CR, and ω is a rolling angular speed) is produced in a radial direction about the rolling center CR in the position corresponding to the lateral acceleration sensor 15. However, the direction of this acceleration is a direction along the center plane CP of the vehicle body and hence, an error cannot be provided in an output from the lateral acceleration sensor 15 for detecting the lateral acceleration Gy perpendicular to the center plane CP of the vehicle body.

On the other hand, for example, if the lateral acceleration sensor 15 is mounted at a location largely far away from the center plane CP of the vehicle body, as shown by a reference character 15a in FIG. 8, a horizontal component of the acceleration rxω² produced is always rightward, irrespective of the direction of the rolling angular speed ω. For this reason, there is a possibility that an error corresponding to the horizontal component of the acceleration Rxω² is generated in the output from the lateral acceleration sensor 15, whereby the possibility of the lateral overturning cannot be determined properly.

Figure 9A:
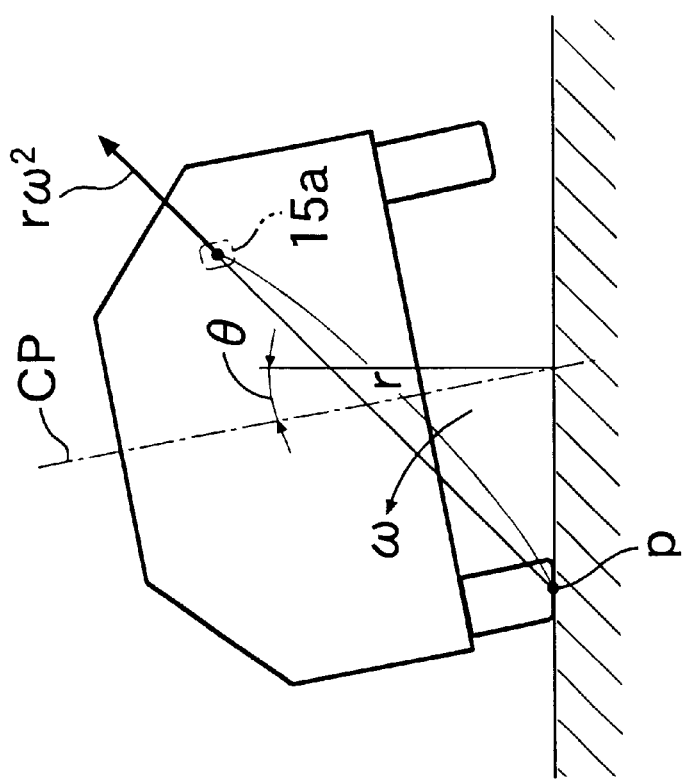
Figure 9B:
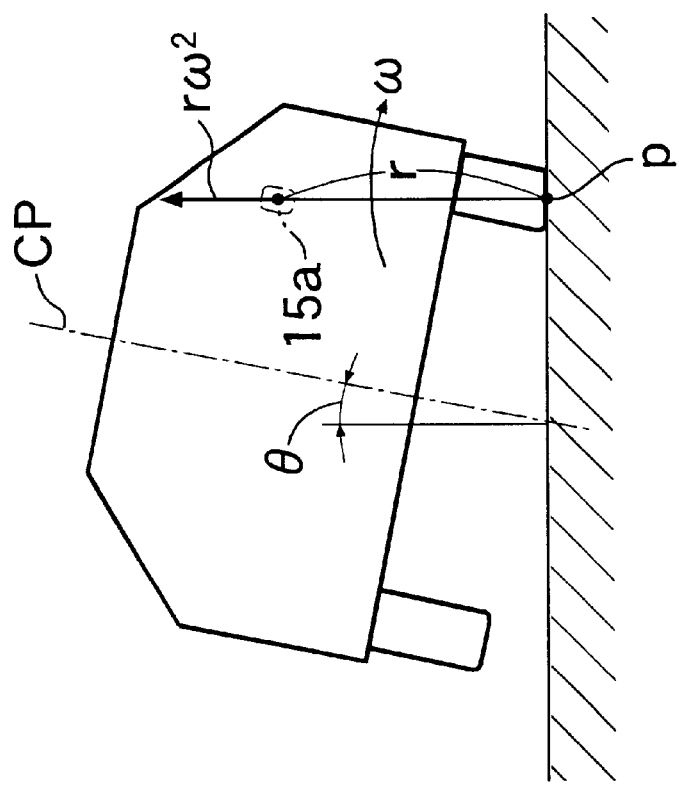

When the vehicle is rolled with an increased rolling angle θ about a point p of contact of a left or right wheel on the ground, as shown in FIGS. 9A and 9B, the distance and direction from the point p of contact of the wheel to the lateral acceleration sensor 15 are varied depending on whether the point p of contact of the wheel as a rolling center is left-hand or right-hand. For this reason, even if a state of rolling movement of the vehicle is laterally symmetric in FIGS. 9A and 9B, the magnitude and direction of the acceleration rxω² are varied in each case, and the unbalance of the output from the lateral acceleration sensor 15 depending on the rolling direction is further increased.

In the present embodiment, however, the lateral acceleration sensor 15 is disposed on the center plane CP of the vehicle body, and hence, even if the point p of contact of any one of the left and right wheels is the rolling center, an equal error is generated in the output from the lateral acceleration sensor 15, whereby an unbalance cannot be produced and thus, a reduction in accuracy of the determination of a possibility of lateral overturning can be suppressed to the minimum.

A second embodiment of the present invention will now be described with reference to FIGS. 10 to 13B.

Figure 10:
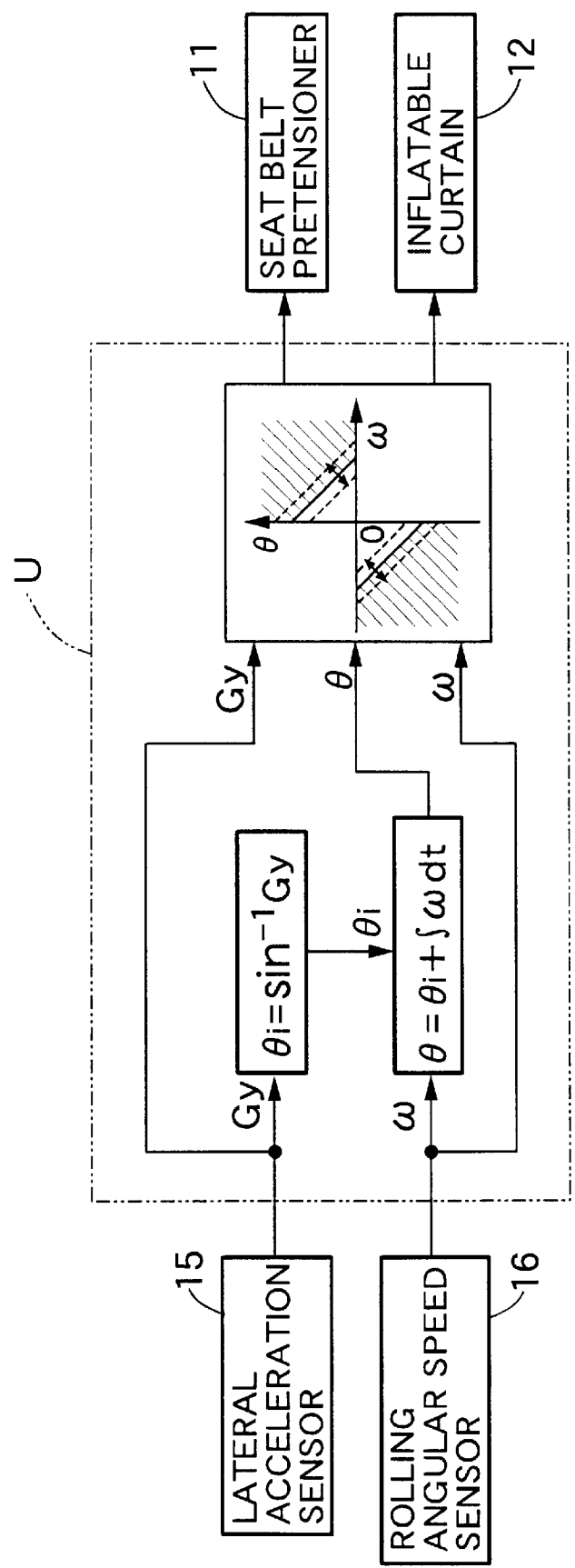

FIG. 10 shows one example of a control system for operating a known seat belt pretensioner 11 and a known air curtain 12 as occupant restraint means upon lateral overturning of the vehicle. The seat belt pretensioner 11 is intended to increase the tension of a webbing of a seat belt to restrain an occupant, and the air curtain 12 is intended to deploy a curtain-shaped air bag along an inner surface of a door window to protect the head of an occupant.

In order to determine that there is a possibility of lateral overturning of the vehicle, the following signals are input to an electronic control unit U: a signal from the lateral acceleration sensor 15 for detecting a lateral acceleration Gy which is an acceleration in a lateral direction of the vehicle body; and a signal from the rolling angular speed sensor 16 for detecting a rolling angular speed ω of the vehicle. The electronic control unit U determines that there is a possibility of lateral overturning of the vehicle, based on the above-described map made using as parameters a rolling angular speed ω and a rolling angle θ of the vehicle calculated from the lateral acceleration Gy and the rolling angular speed ω, and controls the operations of the seat belt pretensioner 11 and the air curtain 12 based on a value of the rolling angular speed ω at that time.

As shown in FIG. 12, a threshold value line S is divided into an air curtain non-operating region S1 and an air curtain operating region S2. The air curtain non-operating region S1 is a region where the absolute value |ω| of the rolling angular speed ω is smaller than a threshold value ωs, and in this region, the vehicle is laterally overturned slowly, because the lateral rolling angular speed ω is smaller. On the other hand, air curtain operating region S2 is a region where the absolute value |ω| of the rolling angular speed ω is equal to or larger than the threshold value ωs, and in this region, the vehicle is laterally overturned rapidly, because the lateral rolling angular speed ω is larger. When a hysteresis line for the vehicle has traversed the air curtain non-operating region S1 from a laterally non-overturning region to a laterally overturning region, only the seat belt pretensioner 11 is operated, and the air curtain 12 is not operated. When the hysteresis line for the vehicle has traversed the air curtain operating region S2 from the laterally non-overturning region to the laterally overturning region, both the seat belt pretensioner 11 and the air curtain 12 are operated.

Whether the air curtain 12 is operated or not, depends on only whether the hysteresis line traverses the air curtain non-operating region S1 or the air curtain operating region S2, and not influenced by the behavior of the hysteresis line after traversing one of the regions. For example, in a case of a hysteresis line shown by H9 in FIG. 12, such hysteresis line H9 first traverses the air curtain non-operating region S1 at a point p and hence, the seat belt pretensioner 11 operated. Thereafter, the hysteresis line H9 assumes threshold value $\omega s$ or more at a point q due to an increase in rolling angular speed $\omega$, but in this case, the air curtain 12 cannot be operated.

Figure 11:
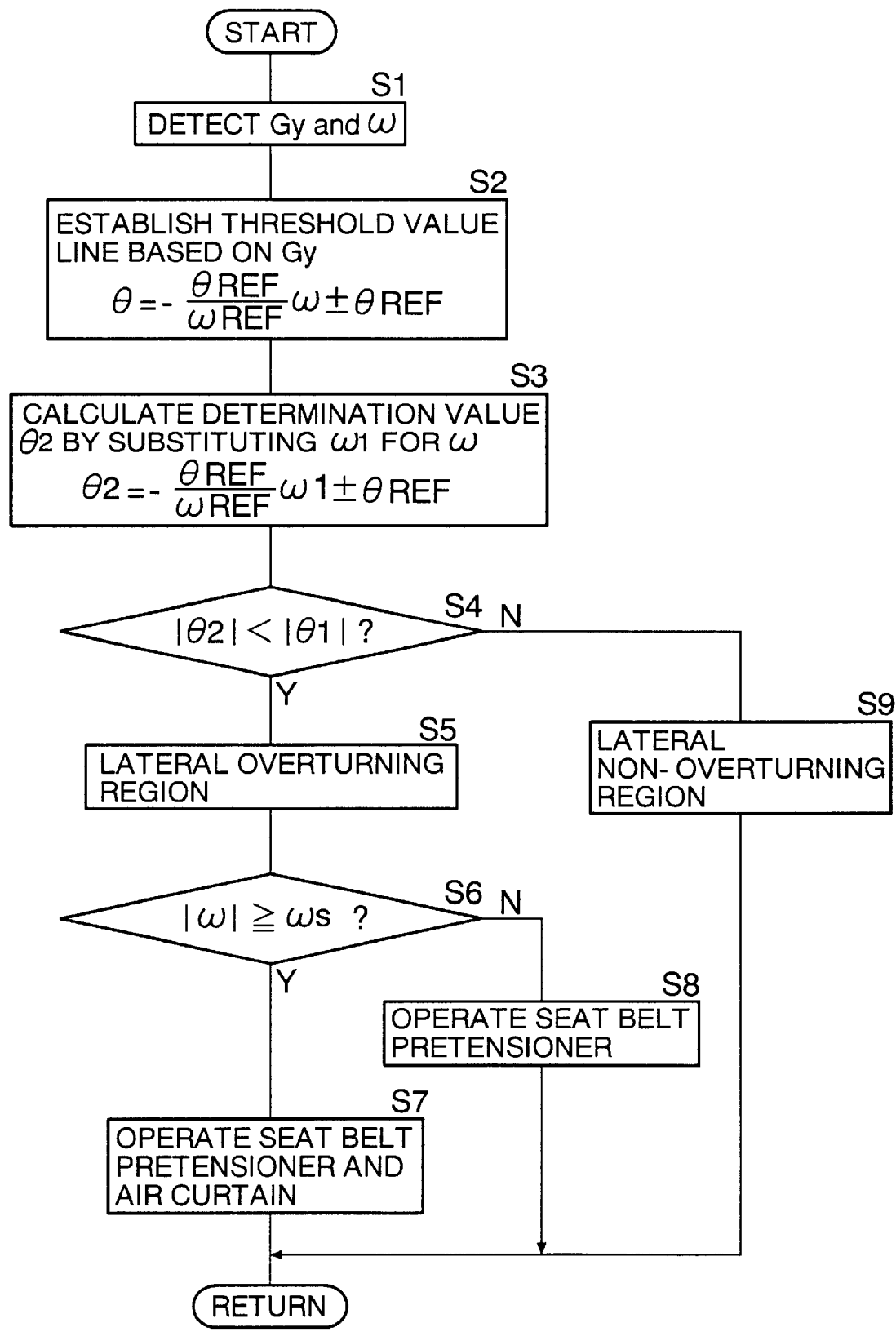

The above-described operation will be further described with reference to FIGS. 6 and 11.

First, a lateral acceleration Gy and a rolling angular speed $\omega$ are read at Step S1, and threshold value lines S, S on the map are determined in accordance with the lateral acceleration Gy at Step S2. The threshold value lines S, S are determined, if a critical rolling angle $\theta$CRT (which is an intercept on the axis of ordinates of the map) and a critical rolling angular speed $\omega$CRT (which is an intercept on the axis of abscissas), are determined. In the present embodiment, when the lateral overturning of the vehicle is promoted due to the lateral acceleration Gy, both the critical rolling angle $\theta$CRT and the critical rolling angular speed $\omega$CRT are decreased, whereby the threshold value lines S, S are moved in the direction toward the origin. When the lateral overturning of the vehicle is suppressed by the lateral acceleration Gy, both the critical rolling angle $\theta$CRT and the critical rolling angular speed $\omega$CRT are increased, whereby the threshold value lines S, S are moved in the direction away from the origin. Thus, it is possible to determine a suitable lateral overturning region and a suitable lateral non-overturning region according to the lateral acceleration Gy of the vehicle.

Subsequently, it is determined whether a coordinate point P provided by a current rolling angle $\theta 1$ and a current rolling angular speed $\omega 1$ is in the lateral overturning region or the lateral non-overturning region. More specifically, at Step S3, a current value of rolling angular speed $\omega 1$ is substituted for $\omega$ in the equation for the threshold value line S to calculate a determination value $\eta 2$. The determination value $\theta 2$ is a $\theta$ coordinate point which is a point Q of intersection between a straight line $\omega = \omega 1$ and the threshold value line S. At subsequent Step S4, the determination value $\theta 2$ is compared with the current rolling angle $\eta 1$. If a relation, $|\theta 2|<|\theta 1|$ is established, it is determined at Step S5 that the coordinate point P provided by the current rolling angle $\theta 1$ and the current rolling angular speed $\omega 1$ is in the lateral overturning region. A case ($|\theta 2|<|\theta 1|$) where the coordinate point P is in the lateral overturning region is shown in FIG. 6.

If the absolute value $|\omega|$ of the rolling angular speed $\omega$ at a time point when the hysteresis line traverses the threshold value lines S, S is equal to or larger than the threshold value $\omega s$ at Step S6, it is determined at Step S7 that the coordinate point p is in the air curtain operating region, whereby both the seat belt pretensioner 11 and the air curtain 12 are operated. If the absolute value $|\omega|$ of the rolling angular speed $\omega$ at a time point when the hysteresis line traverses the threshold value lines S, S is smaller than the threshold value $\omega s$ at Step S6, it is determined at Step S8 that the coordinate point p is in the air curtain non-operating region, whereby only the seat belt pretensioner 11 is operated, and the air curtain 12 is not operated.

If the relation, $|\theta 2|<|\theta 1|$ is not established at Step S4, it is determined at Step S9 that the coordinate point P provided by the current rolling angle $\theta 1$ and the current rolling angular speed $\omega 1$ is in the lateral non-overturning region, whereby both the seat belt pretensioner 11 and the air curtain 12 are not operated.

Figure 13B:
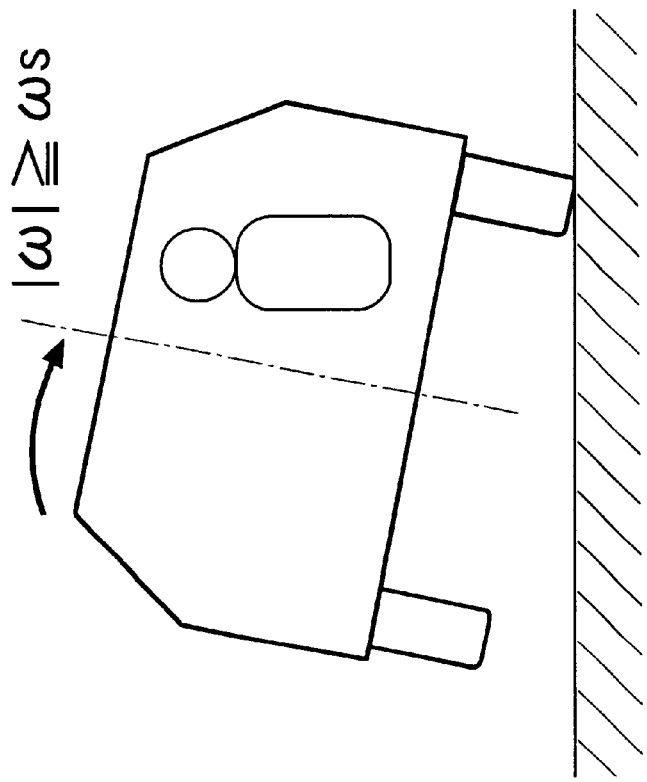
Figure 13A:
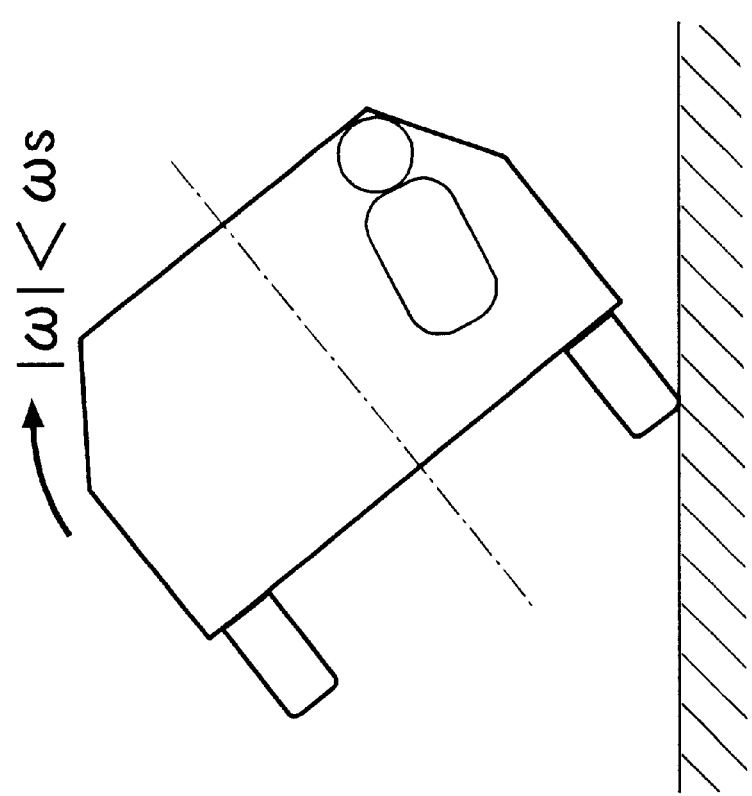

When the vehicle is laterally overturned slowly because the absolute value $|\omega|$ of the rolling angular speed $\omega$ is smaller, as shown in FIG. 13A, an occupant is moved toward the door window by the force of gravity. For this reason, when the air curtain 12 is deployed, there is a possibility that the air curtain 12 interferes with the occupant. However, this problem can be overcome by leaving the air curtain 12 inoperative. The occupant restraint means operated at such time is only the seat belt pretensioner 11, but a sufficient restraint force can be ensured by only the seat belt pretensioner 11, because the vehicle is laterally overturned slowly.

When the vehicle is laterally overturned rapidly, because the absolute value $|\omega|$ of the rolling angular speed $\omega$ is larger, as shown in FIG. 13B, the occupant is left at the original position under the action of inertia and hence, the distance between the occupant and the door window is increased temporarily. Therefore, even if the air curtain 12 is deployed, there is not a possibility that the air curtain 12 interferes with the occupant, and a restraint force enough to resist the rapid lateral overturning can be ensured by the operation of both the air curtain 12 and the seat belt pretensioner 11.

A third embodiment of the present invention will now be described with reference to FIGS. 14 through 17B.

Figure 14:
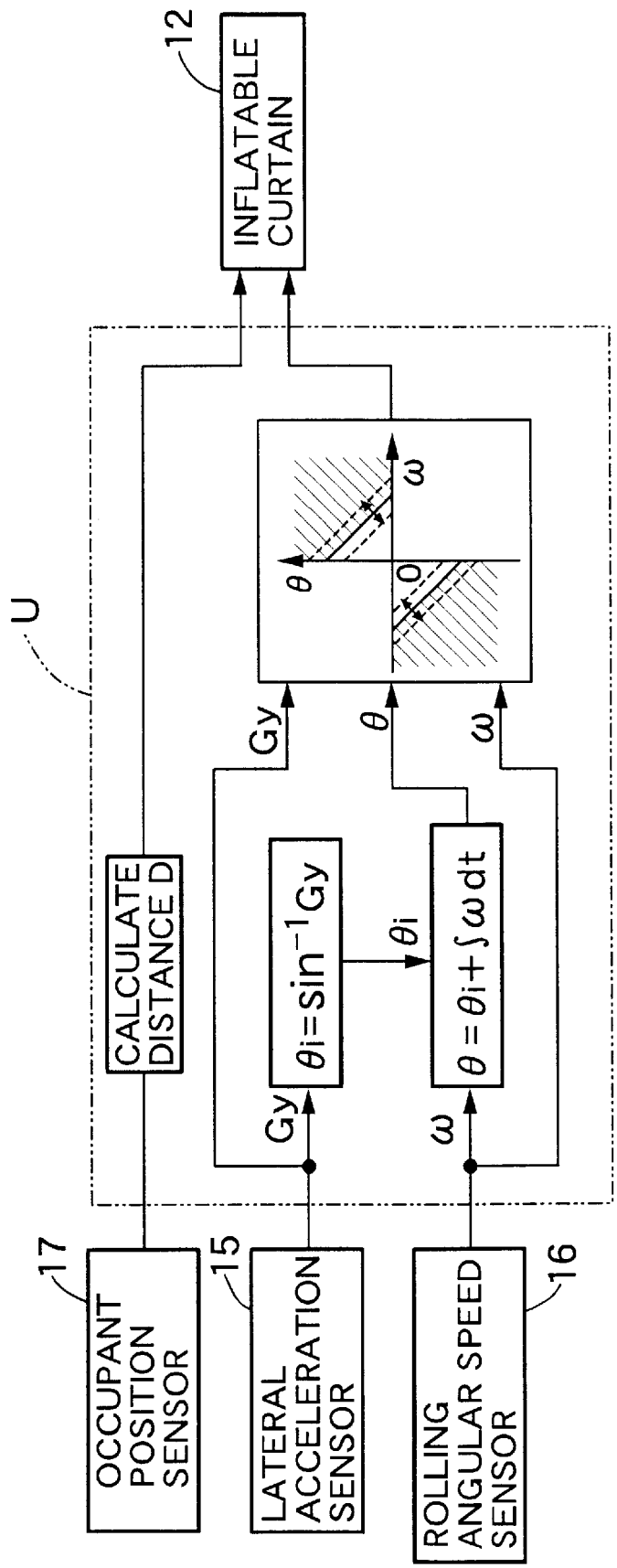

FIG. 14 shows one example of a control system for deploying an air curtain 12 for protecting the head of an occupant along an inner surface of a vehicle compartment upon lateral overturning of a vehicle.

In order to determine that there is a possibility of lateral overturning of the vehicle and to determine whether operation of the air curtain 12 is suitable or not, the following signals are input to an electronic control unit U: a signal from a lateral acceleration sensor 15 for detecting a lateral acceleration Gy which is an acceleration in a lateral direction of the vehicle body; a signal from a rolling angular speed sensor 16 for detecting a rolling angular speed $\omega$ of the vehicle; and a signal from an occupant position sensor 17 for detecting a lateral position of the head of an occupant in the vehicle compartment (Specifically, a lateral distance D between the head of the occupant and an inner surface of a side of the vehicle such as a roof lining, a door window or the like). The occupant position sensor 17 comprises an infrared sensor or a television camera.

Figure 17B:
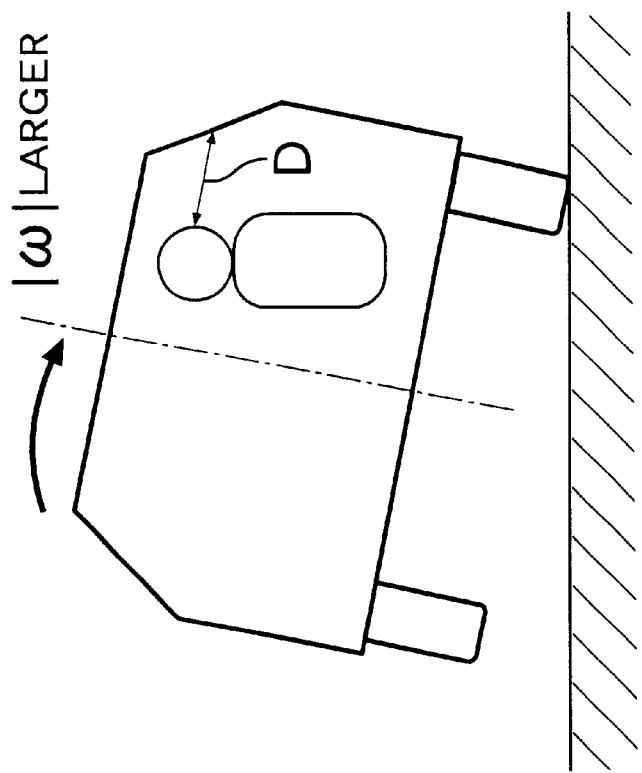
Figure 17A:
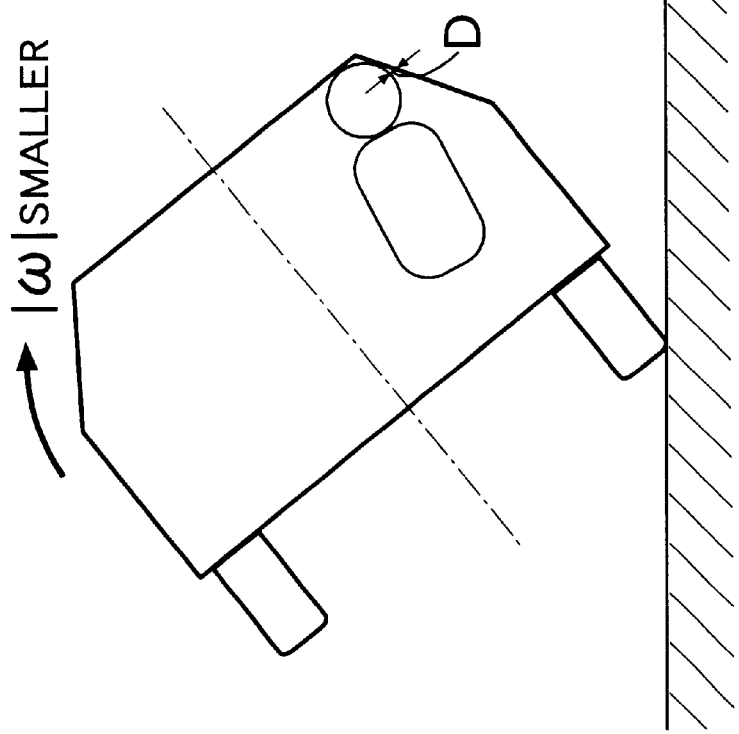

When the vehicle is laterally overturned slowly, because the absolute value $|\omega|$ of the rolling angular speed $\omega$ is smaller, as shown in FIG. 17A, the occupant is moved toward the inner surface of the sides of the vehicle body and as a result, the distance D is decreased. When the vehicle is laterally overturned rapidly, because the absolute value $|\omega|$ of the rolling angular speed $\omega$ is larger, as shown in FIG. 17B, the occupant is left at the original position under the action of inertia and hence, the distance D is increased temporarily. Therefore, when a driver has conducted a driving operation for laterally operating a steering wheel such as a double-lane changing operation, the distance D between the head of the occupant and the inner surface of the side of the vehicle body is varied with the lapse of time.

For the foregoing, a possibility of lateral overturning of the vehicle is determined based on the rolling angle θ and the rolling angular speed ω of the vehicle, on the one hand, and the distance D between the head of the occupant and the inner surface of the side of the vehicle body is calculated based on the output from the occupant position sensor 17, on the other hand. When it is determined that there is a possibility of lateral overturning, and the distance D is equal to or larger than a preset threshold value Dmin, the operation of the air curtain is permitted.

Figure 15:
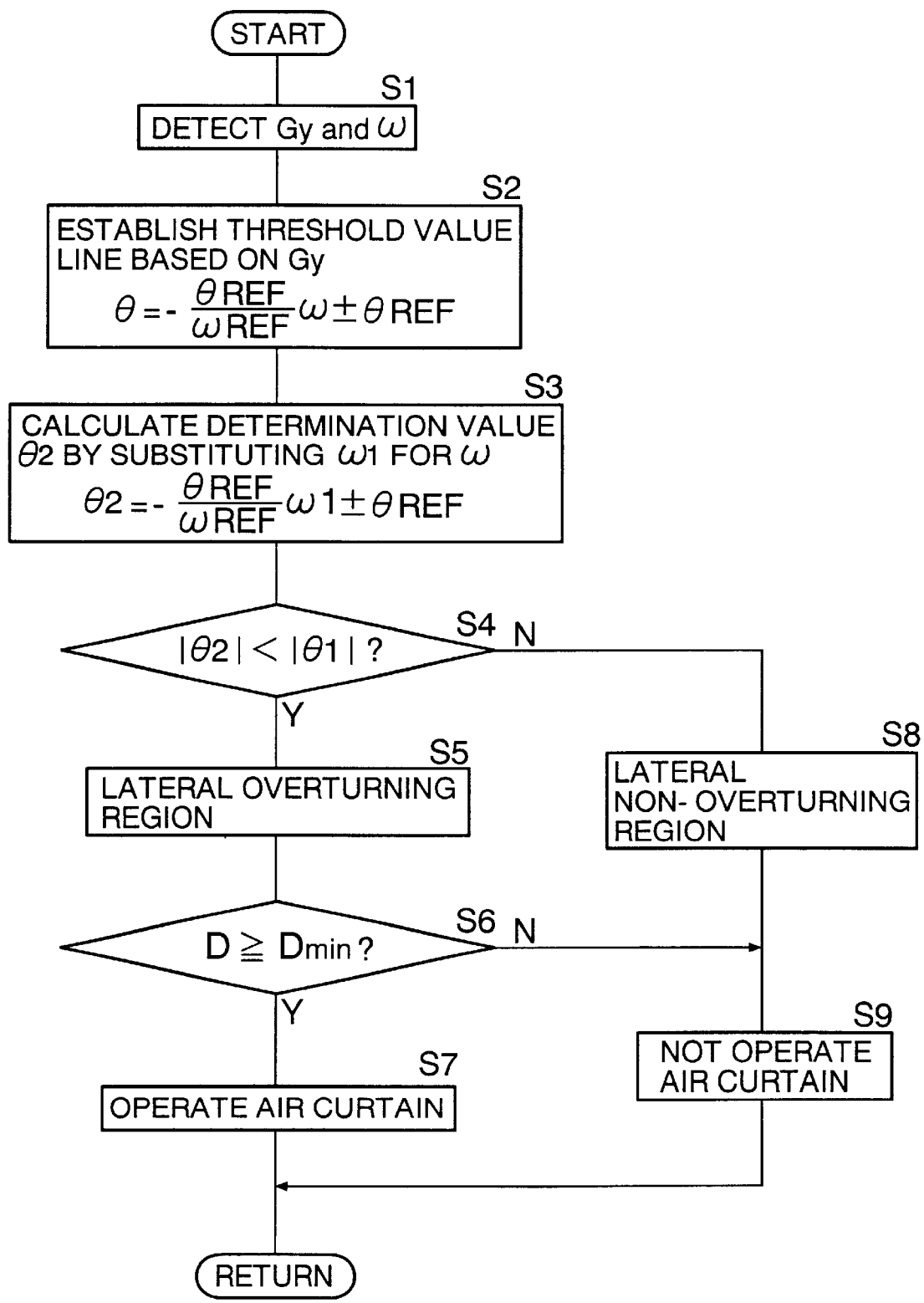

The above-described operation will be further described below with reference to FIGS. 6 and 15.

First, a lateral acceleration Gy and a rolling angular speed ω are read at Step S1, and threshold value lines S, S on the map are determined in accordance with the lateral acceleration Gy at Step S2. The threshold value lines S, S are determined, if a critical rolling angle θCRT (which is an intercept on the axis of ordinates of the map) and a critical rolling angular speed ωCRT (which is an intercept on the axis of abscissas) are determined. In the present embodiment, when the lateral overturning of the vehicle is promoted due to the lateral acceleration Gy, both the critical rolling angle θCRT and the critical rolling angular speed ωCRT are decreased, whereby the threshold value lines S, S are moved in the direction toward the origin. When the lateral overturning of the vehicle is suppressed by the lateral acceleration Gy, both the critical rolling angle θCRT and the critical rolling angular speed ωCRT are increased, whereby the threshold value lines S, S are moved in the direction away from the origin. Thus, it is possible to determine a suitable lateral overturning region and a suitable lateral non-overturning region according to the lateral acceleration Gy of the vehicle.

Subsequently, it is determined whether a coordinate point P provided by a current rolling angle θ1 and a current rolling angular speed ω1 is in the lateral overturning region or the lateral non-overturning region. More specifically, at Step S3, a current value of rolling angular speed ω1 is substituted for ω in the equation for the threshold value line S to calculate a determination value η2. The determination value θ2 is a θ coordinate point which is a point Q of intersection between a straight line ω=ω1 and the threshold value line S. At subsequent Step S4, the determination value θ2 is compared with the current rolling angle η1. If a relation, |θ2|<|θ1| is established, it is determined at Step S5 that the coordinate point P provided by the current rolling angle θ1 and the current rolling angular speed ω1 is in the lateral overturning region. A case (|θ2|<|θ1|) where the coordinate point P is in the lateral overturning region is shown in FIG. 6.

At subsequent Step S6, a lateral distance D between the head of the occupant and the inner surface of the side of the vehicle body such as a roof lining or a door window is calculated from the lateral position of the head of the occupant detected by the occupant position sensor 17, and is compared with the preset threshold value Dmin. The threshold value Dmin is set as a minimum distance ensuring that the air curtain 12 does not interfere with the head of the occupant, even if the air curtain 12 is deployed.

Thus, if the coordinate point P provided by the current rolling angle θ1 and the current rolling angular speed ω1 is in the lateral overturning region at Step S5 and the distance D between the head of the occupant and the inner surface of the side of the vehicle body is equal to or larger than the threshold value Dmin at Step S6, the air curtain 12 is deployed at Step S7 to restrain the head of the occupant upon the lateral overturning of the vehicle. On the other hand, if the relation, |θ2|<|θ1| is not established at Step S4, it is determined at Step S9 that the coordinate point P provided by the current rolling angle θ1 and the current rolling angular speed ω1 is in the lateral non-overturning region, whereby the air curtain 12 is not operated. Even if it is determined at Step S5 that the coordinate point P is in the lateral overturning region, if the distance D between the head of the occupant and the inner surface of the side of the vehicle body is smaller than the threshold value Dmin, the air curtain 12 is not operated, and the interference of the air curtain 12 with the head of the occupant is avoided.

Figure 16:
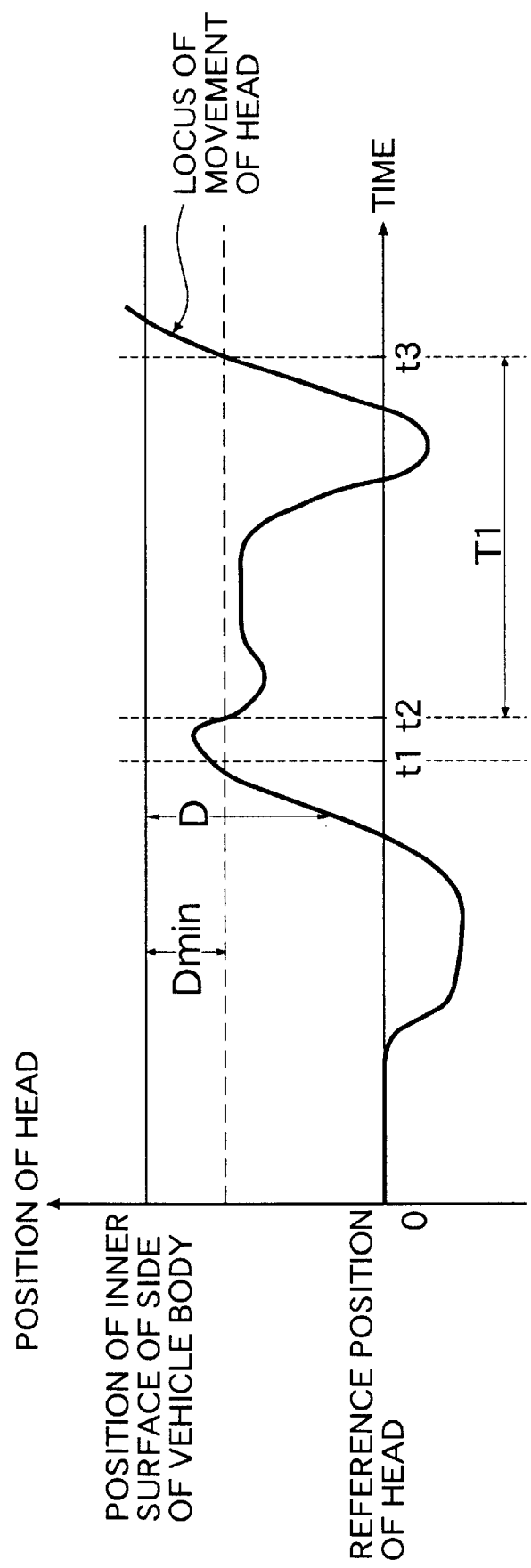

FIG. 16 shows a particular example of a variation in distance D between the head of the occupant and the inner surface of the side of the vehicle body with the passage of time.

When the hysteresis line enters into the lateral overturning region at a time point t1, whereby it is determined that there is a possibility of lateral overturning of the vehicle, the deployment of the air curtain 12 is prohibited to avoid the interference of the air curtain 12 with the head of the occupant, because the distance D between the head of the occupant and the inner surface of the side of the vehicle body is smaller than the threshold value Dmin. If the distance D is thereafter increased and assumes the threshold value Dmin or more at a time point t2, the deployment of the air curtain 12 is permitted. If the distance D is decreased to reach smaller than the threshold value Dmin at a time point t3, the deployment of the air curtain 12 is prohibited again. Therefore, in the example shown in FIG. 16, a region T1 from the time point t2 to the time point t3 is a period of time in which the deployment of the air curtain 12 is permitted, and at the time point t2 which is at the beginning of the region T1, the hysteresis line has already entered into the lateral overturning region and hence, the air curtain 12 is actually deployed at the time point t2.

It should be noted that if the hysteresis line enters into the lateral overturning region at the middle of the region T1, the air curtain 12 is deployed at that time point.

A fourth embodiment of the present invention will be described with reference to FIG. 18.

In the third embodiment, it is determined whether the deployment of the air curtain 12 is permitted or not, based on the distance D between the head of the occupant and the inner surface of the side of the vehicle body, but in the fourth embodiment, it is determined whether the deployment of the air curtain 12 is permitted or not, based on a lateral relative speed V between the head of the occupant and the inner surface of the side of the vehicle body.

In FIG. 18, a solid line indicates a speed of movement of the inner surface of the side of the vehicle body in the outward direction of the vehicle body, and a broken line indicates a speed of movement of the head of the occupant in the outward direction of the vehicle body. Therefore, in regions T1, T2 and T3 in which the solid line is above the broken line, the head of the occupant has a relative speed V in a direction away from the inner surface of the side of the vehicle body. If the deployment of the air curtain 12 is permitted in any of the regions T1, T2 and T3 in which the head of the occupant is moved away from the inner surface of the side of the vehicle body, it is possible to avoid the air curtain 12 from interfering with the head of the occupant. In the fourth embodiment shown in FIG. 18, the hysteresis line enters into the lateral overturning region at the time point t1 included in the region T1 and hence, the air curtain 12 is deployed at that time point. If the hysteresis enters into the lateral overturning region at a time point between the regions T1 and T2, the air curtain 12 is deployed simultaneously with the beginning of the region T2.

The relative speed V between the head of the occupant and the inner surface of the side of the vehicle body can be calculated by the time-differentiation of the position of the head of the occupant detected by the occupant position sensor 17.

Although the embodiments of the present invention have been described in detail, it will be understood that the present invention is not limited to the above-described embodiments, and various modifications in design may be made without departing from the spirit and scope of the invention defined in the appended claims.

For example, the determination of the presence or absence of a possibility of lateral overturning of the vehicle is applied to the control of the deployment of the air curtain in the first embodiment, but may be utilized to another application such as the control of the deployment of a side air bag or the control of the deployment of a housed roll bar.

The occupant restraint means according to the second aspect and feature of the present invention is not limited to the seat belt pretensioner 11 and the air curtain 12, but includes an air bag device mounted in a steering wheel, a dashboard, a seat or the like; an air belt device in which a webbing of a seat belt is expanded; and the like. A so-called inflatable tube adapted to deploy a cylindrical bag along an inner surface of a door window is included in the air curtain described in the third aspect and feature of the present invention.

The occupant restraint means described in each of the fourth through sixth aspects and features of the present invention is not limited to the air curtain 12, and includes a so-called inflatable tube adapted to deploy a cylindrical bag along an inner surface of a door window. In addition, the timing of deployment of the air curtain 12 can be controlled in consideration of both the distance D between the occupant and the inner surface of the side of the vehicle body and the relative speed V between the occupant and the inner surface of the side of the vehicle body.

An initial value θi of the rolling angle θ of the vehicle can also be calculated according to $\theta i = \cos^{-1} Gz$, using a vertical component Gz which is a component of a gravitational acceleration G in a vertical direction of the vehicle body.

What is claimed is:

1. A process for determining the lateral overturning of a vehicle, comprising the steps of:
    defining a two-dimensional map made using a rolling angle and a rolling angular speed of the vehicle;
    establishing a threshold value line separating a lateral overturning region farther from an origin and a lateral non-overturning region closer to the origin of the two-dimensional map made;
    mapping a hysteresis line for actual rolling angles and actual rolling angular speeds of the vehicle on said map; and
    determining that there is a possibility of lateral overturning of the vehicle when said hysteresis line traverses said threshold value line from the lateral non-overturning region to the lateral overturning region, and
    wherein said step of establishing said threshold value line involves detection of lateral acceleration of the vehicle using a lateral acceleration sensor disposed on a center plane of a vehicle body.

2. A process for determining the lateral overturning of a vehicle according to claim 1, comprising the further step of selectively operating a plurality of occupant restraint mechanisms of the vehicle based on the vehicle's rolling angular speed at a time when it is determined that there is the possibility of lateral overturning of the vehicle.

3. A process for determining the lateral overturning of a vehicle according to claim 1, comprising the further step of controlling timing of deployment of occupant restraint mechanisms of the vehicle based on a condition of the occupant within a vehicle compartment relative to a lateral direction of a vehicle body at a time when it is determined that there is the possibility of lateral overturning of the vehicle.

4. A process for determining the lateral overturning of a vehicle according to claim 1, comprising the further step of selectively operating a plurality of occupant restraint mechanisms of the vehicle based on the vehicle's rolling angular speed at a time when it is determined that there is the possibility of lateral overturning of the vehicle.

5. A process for determining the lateral overturning of a vehicle according to claim 1, comprising the further step of controlling timing of deployment of an occupant restraint mechanism of the vehicle based on a condition of the occupant within a vehicle compartment relative to a lateral direction of a vehicle body at a time when it is determined that there is the possibility of lateral overturning of the vehicle.

6. An occupant protecting system comprising:
    a plurality of occupant restraint mechanisms;
    a mechanism which defines a two-dimensional map made using a rolling angle and a rolling angular speed of a vehicle as parameters;
    a mechanism which establishes a threshold value line separating a lateral overturning region farther from an origin and a lateral non-overturning region closer to the origin on the two-dimensional map; and
    a controller which determines that there is a possibility of lateral overturning of the vehicle when a hysteresis line for actual rolling angles and actual rolling angular speeds of the vehicle traverses said threshold line from the lateral non-overturning region to the lateral overturning region, and which operates said plurality of occupant restraint mechanisms when it is determined that there is a possibility of lateral overturning of the vehicle, and
    wherein said plurality of occupant restraint mechanisms are operated selectively based on the vehicle's rolling angular speed at a time when it is determined that there is the possibility of lateral overturning of the vehicle.

7. An occupant protecting system according to claim 6, further including a detector which detects said actual rolling angles of the vehicle and a detector which detects said actual rolling angular speeds of the vehicle.

8. An occupant protecting system according to claim 6, wherein said plurality of occupant restraint mechanisms include a seat belt pretensioner and an air curtain, and in a condition where the rolling angular speed is smaller than a predetermined value, only said seat belt pretensioner is operated, and in a condition where the rolling angular speed is at least as large as the predetermined value, both said seat belt pretensioner and said air curtain are operated.

9. An occupant protecting system according to claim 6, further including a lateral acceleration sensor disposed on a center plane of a vehicle body, and said mechanism which establishes said threshold value line does so based on an output of said lateral acceleration sensor.

10. An occupant protecting system comprising:
    an occupant restraint mechanism;
    a mechanism which defines a two-dimensional map made using a rolling angle and a rolling angular speed of a vehicle as parameters;

a mechanism which establishes a threshold value line separating a lateral overturning region farther from an origin and a lateral non-overturning region closer to the origin on said two-dimensional map; and a controller which determines that there is a possibility of lateral overturning of the when a hysteresis line for actual rolling angles and actual rolling angular speeds of the vehicle traverses said threshold line from the lateral non-overturning region to the lateral overturning region, and which operates said occupant restraint mechanism when it is determined that there is a possibility of lateral overturning of the vehicle, and wherein said controller further controls timing of deployment of said occupant restraint mechanism based on a condition of the occupant within a vehicle compartment relative to a lateral direction of a vehicle body, attendant on the lateral overturning of the vehicle.

11. An occupant protecting system according to claim 10, wherein the condition of the occupant is at least one of a distance between the occupant and the inner surface of the side of the vehicle body and a relative movement between the occupant and the inner surface of the side of the vehicle body.

12. An occupant protecting system according to claim 11, wherein the condition of the occupant is the distance between the occupant and the inner surface of the side of the vehicle body, and the occupant restraint mechanism is not deployed unless said distance is at least a predetermined value at a time when it is determined that there is the possibility of lateral overturning of the vehicle.

13. An occupant protecting system according to claim 11, wherein the condition of the occupant is the relative movement between the occupant and the inner surface of the side of the vehicle body, and the occupant retraint mechanism is not deployed unless a relative movement of the occupant is away from the inner surface of the side of the vehicle body at a time when it is determined that there is the possibility of lateral overturning of the vehicle.

14. An occupant protecting system according to claim 10, further including a detector which detects said actual rolling angles of the vehicle and a detector which detects said actual rolling angular speeds of the vehicle, and a detector which detects said condition of the occupant within a vehicle compartment relative to the lateral direction of a vehicle body.

15. An occupant protecting system according to claim 10, further including a lateral acceleration sensor disposed on a center plane of a vehicle body, and said mechanism which establishes said threshold value line does so based on an output of said lateral acceleration sensor.

* * * * *

UNITED STATES PATENT AND TRADEMARK OFFICE
CERTIFICATE OF CORRECTION

PATENT NO.     : 6,618,655 B2
DATED          : September 9, 2003
INVENTOR(S)    : Tobaru et al.

It is certified that error appears in the above-identified patent and that said Letters Patent is hereby corrected as shown below:

Column 4,
Line 42, after "thereof." and before "The" insert a new paragraph indentation.

Column 9,
Line 32, change "a determination value $\eta 2$." to -- a determination value $\theta 2$. --.
Line 36, change "with the current rolling angle $\eta 1$." to -- with the current rolling angle $\theta 1$. --.

Column 11,
Line 50, change "a determination value $\eta 2$." to -- a determination value $\theta 2$. --.
Line 54, change "with the current rolling angle $\eta 1$." to -- with the current rolling angle $\theta 1$. --.

Column 13,
Line 40, change "a determination value $\eta 2$." to -- a determination value $\theta 2$. --.
Line 44, change "with the current rolling angle $\eta 1$." to -- with the current rolling angle $\theta 1$. --.

Column 17,
Line 6, after "lateral overturning of the" and before "when" insert -- vehicle --.

Signed and Sealed this

Thirteenth Day of July, 2004

JON W. DUDAS
*Acting Director of the United States Patent and Trademark Office*